(12) United States Patent
Oomura et al.

(10) Patent No.: US 8,264,721 B2
(45) Date of Patent: Sep. 11, 2012

(54) SERVER APPARATUS, MANAGEMENT SYSTEM, AND METHOD

(75) Inventors: Hiroshi Oomura, Kawasaki (JP); Shigemi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 12/259,702

(22) Filed: Oct. 28, 2008

(65) Prior Publication Data

US 2009/0109477 A1 Apr. 30, 2009

(30) Foreign Application Priority Data

Oct. 30, 2007 (JP) ................................ 2007-281899

(51) Int. Cl.
*G06F 3/12* (2006.01)
*G06F 15/16* (2006.01)
*G06K 15/00* (2006.01)
*H04N 1/40* (2006.01)
*H04L 29/06* (2006.01)

(52) U.S. Cl. ...... 358/1.15; 358/1.16; 358/444; 713/155; 726/4

(58) Field of Classification Search ................ 358/1.15, 358/1.16, 442, 444; 713/161, 155, 154, 152, 713/151, 169, 171, 179, 93; 709/219; 726/26, 726/28, 29, 30, 32, 17, 4, 14
See application file for complete search history.

(56) References Cited

U.S. PATENT DOCUMENTS

| | | | |
|---|---|---|---|
| 6,807,632 B1 * | 10/2004 | Carpentier et al. | 713/165 |
| 7,373,330 B1 * | 5/2008 | Klebe | 705/51 |
| 7,426,750 B2 * | 9/2008 | Cooper et al. | 726/26 |
| 7,428,751 B2 * | 9/2008 | Oom Temudo de Castro et al. | 726/10 |
| 7,568,219 B2 * | 7/2009 | Campbell et al. | 726/4 |
| 7,823,204 B2 * | 10/2010 | Gupta et al. | 726/23 |
| 7,971,242 B2 * | 6/2011 | Tsuchitoi | 726/20 |
| RE42,725 E * | 9/2011 | Chang et al. | 709/217 |
| 2003/0046587 A1 * | 3/2003 | Bheemarasetti et al. | 713/201 |
| 2004/0243832 A1 * | 12/2004 | Wilf et al. | 713/200 |
| 2006/0015716 A1 * | 1/2006 | Thornton et al. | 713/155 |
| 2006/0271936 A1 * | 11/2006 | Matsuda et al. | 718/102 |
| 2007/0018785 A1 * | 1/2007 | Chi | 340/5.2 |
| 2007/0121151 A1 * | 5/2007 | Uchida | 358/1.15 |
| 2007/0177920 A1 * | 8/2007 | Katano et al. | 400/76 |
| 2007/0245409 A1 * | 10/2007 | Harris et al. | 726/5 |
| 2007/0273921 A1 * | 11/2007 | Yamakawa | 358/1.15 |
| 2008/0028448 A1 * | 1/2008 | Tsuchitoi | 726/6 |

(Continued)

FOREIGN PATENT DOCUMENTS

JP 2003-308184 10/2003

(Continued)

*Primary Examiner* — Madelein A Nguyen
(74) *Attorney, Agent, or Firm* — Canon USA, Inc. IP Division

(57) ABSTRACT

A server apparatus configured to manage log information corresponding to job information transmitted from a host computer to a printer includes a storage unit storing the log information received in a temporary storage area, an issue unit configured to issue identification information identifying the log information, a generation unit configured to generate authentication information based on the identification information and authenticate the identification information, a transmission unit configured to transmit the identification to the host computer, a reception unit configured to receive, from the image processing apparatus, identification information and authentication information extracted by the image processing apparatus from job information received by the image processing apparatus from the host computer, a determination unit configured to determine whether log information corresponding to the identification information is stored in the temporary storage area, and a notification unit configured to notify the image processing apparatus of the determination result.

17 Claims, 19 Drawing Sheets

U.S. PATENT DOCUMENTS

| | | | |
|---|---|---|---|
| 2008/0098212 A1* | 4/2008 | Helms et al. | 713/155 |
| 2008/0244708 A1* | 10/2008 | Wilkie et al. | 726/4 |
| 2008/0259386 A1* | 10/2008 | Fujino | 358/1.15 |
| 2008/0307504 A1* | 12/2008 | Cisler et al. | 726/4 |
| 2009/0077383 A1* | 3/2009 | de Monseignat et al. | 713/175 |
| 2010/0182640 A1* | 7/2010 | Daigo | 358/1.15 |
| 2011/0197284 A1* | 8/2011 | Ahuja et al. | 726/26 |

FOREIGN PATENT DOCUMENTS

| | | |
|---|---|---|
| JP | 2003-316554 | 11/2003 |

* cited by examiner

FIG. 4
700A, 700B

| |  |
|---|---|
| UUID OF LOG BLOCK | 710 |
| MAC VALUE OF UUID OF LOG BLOCK | 720 |

FIG. 5

| UUID OF LOG BLOCK | LOG BLOCK INFORMATION | |
|---|---|---|
| 711 — UUID HEADER OF LOG BLOCK | DOCUMENT INFORMATION HEADER LOG BLOCK | 410 |
| 712 — UUID1 OF LOG BLOCK | PAGE INFORMATION LOG BLOCK (1-ST PAGE) | 420 |
| ⋮ | ⋮ | |
| 712 — UUIDn OF LOG BLOCK | PAGE INFORMATION LOG BLOCK (N-TH PAGE) | 420 |
| 713 — UUIDn+1 OF LOG BLOCK | DOCUMENT INFORMATION TERMINATOR BLOCK | 430 |

810 — HOST LOG ACQUISITION INFORMATION
HOST LOG ACQUISITION INFORMATION = {ACQUIRED | NOT ACQUIRED}

FIG. 20

STORAGE MEDIUM SUCH AS FD/CD-ROM

| DIRECTORY INFORMATION |
|---|
| FIRST PROCESSING PROGRAM<br>SET OF PROGRAM CODES CORRESPONDING TO STEPS OF<br>FLOW CHART SHOWN IN FIG. 10 |
| |

FIG. 21

STORAGE MEDIUM SUCH AS FD/CD-ROM

| DIRECTORY INFORMATION |
|---|
| FIRST PROCESSING PROGRAM<br>SET OF PROGRAM CODES CORRESPONDING TO STEPS OF<br>FLOW CHART SHOWN IN FIG. 11 |
| SECOND PROCESSING PROGRAM<br>SET OF PROGRAM CODES CORRESPONDING TO STEPS OF<br>FLOW CHART SHOWN IN FIG. 12 |
| THIRD PROCESSING PROGRAM<br>SET OF PROGRAM CODES CORRESPONDING TO STEPS OF<br>FLOW CHART SHOWN IN FIG. 13 |
| |

SERVER APPARATUS, MANAGEMENT SYSTEM, AND METHOD

BACKGROUND OF THE INVENTION

1. Field of the Invention

The present invention relates to a management system including an information processing apparatus configured to produce a job, an image processing apparatus configured to execute an image processing according to a job, and a server apparatus configured to manage log information corresponding to a job.

2. Description of the Related Art

A management system is known which manages network-connected peripheral apparatus/devices such as a printer, a scanner, a facsimile machine, a copying machine, or a multifunction peripheral device (MFP).

In such a management system, a job management method is known to acquire a large number of pieces of print job information and manage them in an image processing system.

To properly manage jobs (job accounts) for each of users or groups, it is necessary to acquire information associated with jobs performed in peripheral apparatuses.

Some systems are configured to store character strings or page images included in jobs printed by users and check print logs.

FIGS. 22 to 24 illustrate some examples of methods of acquiring job information.

Referring to FIGS. 22 to 24, a process performed by a printer to generate log information using a PDL (Page Description Language) is described below.

In the examples of print systems shown in FIGS. 22 to 24, a host, a printer and a server configured to manage log information are capable of communicating with each other.

As shown in FIG. 22, the printer 200 produces log information based on information included in job information 500 produced by a printer driver installed in the host 100, and the printer 200 transmits the produced log information as log information 400B to the server 300. If the server 300 receives the log information 400B produced by the printer 200, the server 300 stores it in a storage device disposed in the server 300.

In many cases, the printer 200 is shared by a plurality of hosts 100.

In this case, when character strings or page images included in jobs are stored and print logs are checked, a large processing load is imposed on the printer 200 in the process of producing logs.

In a case where a low-cost low-performance printer is used as the printer 200, there is a possibility that a low-performance hardware configuration makes it possible to produce log information associated with character strings or page images. Furthermore, it is not assured that information included in the job information 500 is always valid.

On the other hand, in a print system in which a host produces log information, as shown in FIG. 23, the printer driver installed in the host 100 produces log information 400A of a print job and transfers it to the server 300. Thereafter, the job information 500 is transferred to the printer 200.

In this case, if the host 100 is configured to authenticate users, it is possible to acquire high-accuracy log information 400A including information indicating names of users who actually performed printing.

In many cases, the host 100 is higher in performance than the printer 200, and each host is capable of collecting logs.

Thus, in the system in which the host produces log information, it is possible to efficiently process the log information 400A.

However, in this system, when the printer 200 actually performs printing, it is not assured that log information associated with the printing has been acquired by the host 100.

In the case of a print system in which the host 100 and the printer 200 are configured to produce log information, as shown in FIG. 24, the printer driver installed in the host 100 produces log information 400A of a print job and transfers it to the server 300. Thereafter, the job information 500 is transferred to the printer 200. The printer 200 also produces log information 400B and transmits it to the server 300. The server 300 stores the received log information 400A and 400B in the storage device.

This provides a most reliable method. However, in this method, the server 300 needs to store and manage two pieces of log information 400A and 400B for one print job.

To store two pieces of log information 400A and 400B, a large memory space is necessary. Japanese Patent Laid-Open No. 2003-308184 discloses a technique to avoid the above problem. In this technique, an ID is assigned to each print job and two pieces of log information 400A and log information 400B are merged together with the ID by the server 300.

However, this technique has a problem similar to that of the conventional technique described above with reference to FIG. 22 in which the printer produces log information using the PDL That is, to store character strings or page images included in jobs and check print logs, a very great processing load is imposed on the printer 200 in the production of logs.

Furthermore, when a low-cost but low-performance printer is used as the printer 200, low-performance hardware makes it difficult to produce log information associated with character strings or page images.

Japanese Patent Laid-Open No. 2003-308184 also discloses a job management system in which a client computer acquires job information via communication from a printer, and a job account server manages the job information acquired by client computer.

In a system disclosed in Japanese Patent Laid-Open No. 2003-316554, a printer acquires jobs received from a plurality of client computers and transmits job logs to a job account server, which in turn manages the received job logs.

In the conventional log management systems, as described above, job information is acquired from a host or a printer, and a job account server manages the job information in a merged form.

However, all log management systems described above have the following problems.

More accurate information can be provided by the log information 400A produced by the host 100 used by a user to actually perform printing than can be provided by log information produced by other apparatus. However, the log management systems described above do not support the production of the log information 400A by the host 100.

The host 100 has a hardware resource with higher performance than that of the printer 200. Thus, it is desirable to produce the log information 400A by the host 100. However, the log management systems described above do not support the production of the log information 400A by the host 100.

Besides, it is difficult for the printer 200 to determine whether printing is performed for a job whose log information has been acquired by the host 100.

Furthermore, in the conventional job management systems, although the job account server is capable of managing host logs or printer logs in the merged form, it is not assumed that image logs are managed in the merged form.

Therefore, as to image logs, the job account server separately acquires log information from the host and log information from the printer and separately stores and manages the acquired log information.

That is, the job account server manages the image logs acquired from the host or the printer in a duplicated manner, and thus the resources are not used in an efficient manner.

Another problem in the job management systems is that when a printing apparatus prints an image of each page according to an acquired job, it is difficult to determine whether data of each page has not been tampered with.

SUMMARY OF THE INVENTION

In view of the above, the present invention provides a technique of notifying an image processing apparatus whether log information has been acquired from the information processing apparatus as to job information received by the image processing apparatus from an information processing apparatus.

The present invention provides a server apparatus configured to manage log information corresponding to job information transmitted from a host computer to an image processing apparatus, including a storage unit configured to store, in a temporary storage area, the log information received from the host computer, an issue unit configured to issue identification information identifying the log information received from the host computer, a generation unit configured to generate authentication information based on the identification information, the authentication information serving as information authenticating that the identification information issued by the issue unit is the identification information generated by the server apparatus, a transmission unit configured to transmit the identification information issued by the issue unit and the authentication information generated by the generation unit to the host computer, a reception unit configured to receive, from the image processing apparatus, identification information and authentication information extracted by the image processing apparatus from job information received by the image processing apparatus from the host computer, a determination unit configured to determine whether log information corresponding to the identification information received by the reception unit is stored in the temporary storage area, and a notification unit configured to notify the image processing apparatus of a result of the determination made by the determination unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating a data structure of information associated with a UUID and a MAC value.

FIG. 5 is a diagram illustrating a data structure of information stored in a log temporary storage device.

FIG. 7 is a diagram illustrating a data structure of host log acquisition information provided to printer from a server.

FIG. 20 is a diagram showing a memory map of a storage medium that stores various data processing programs readable by a printing apparatus, according to an embodiment of the present invention.

FIG. 21 is a diagram showing a memory map of a storage medium that stores various data processing programs readable by an information processing apparatus according to an embodiment of the present invention.

DESCRIPTION OF THE EMBODIMENTS

The present invention is described in further detail below with reference to exemplary embodiments in conjunction with the accompanying drawings.

System Configuration

First Exemplary Embodiment

Figure 1:
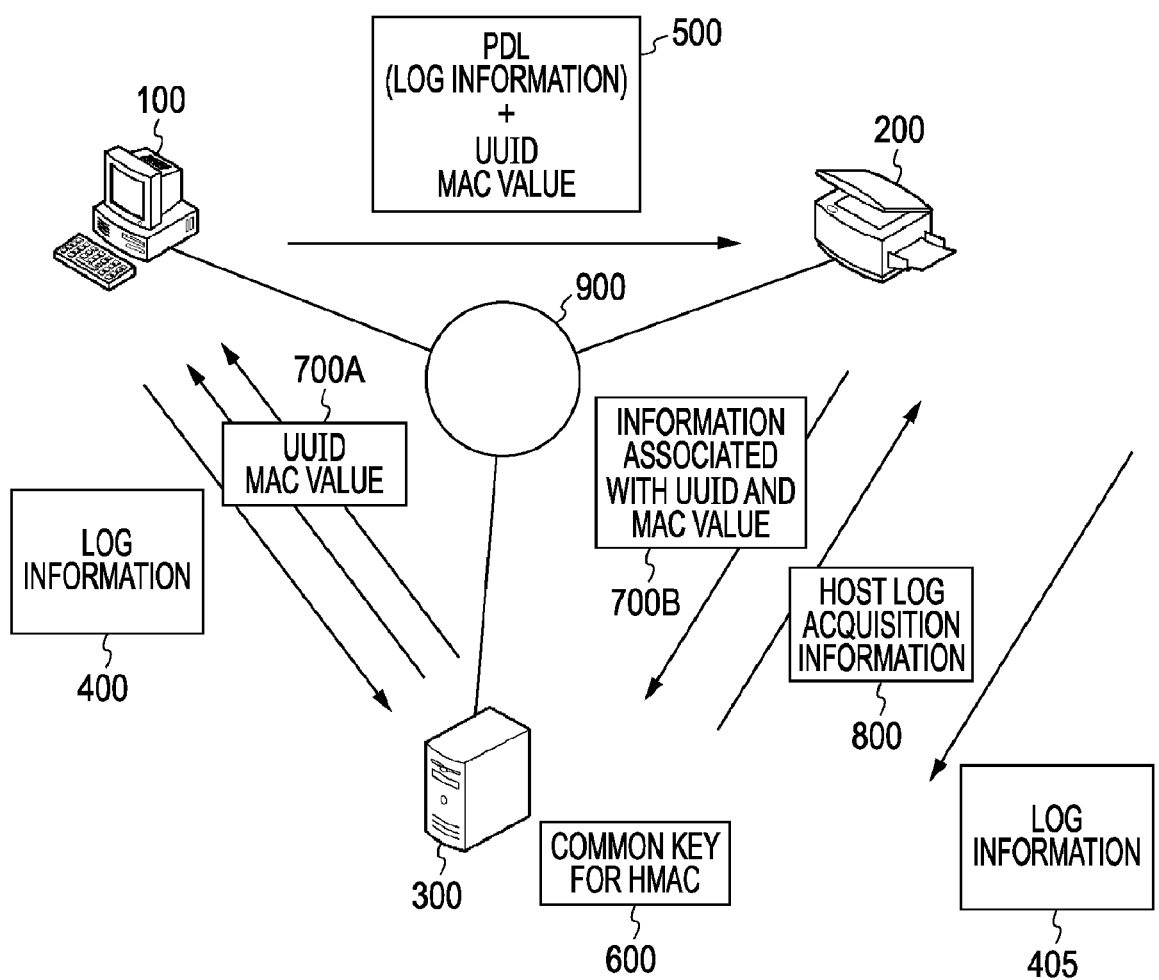
FIG. 1 is a diagram illustrating a print system including a log management apparatus according to an embodiment of the present invention.

FIG. 1 is a diagram illustrating a print system including a log management apparatus according to a first exemplary embodiment of the present invention. In the present embodiment, the print system is configured such that a host, a printer, and a server are capable of communicating with each other via a network. In the following explanation, it is assumed by way of example that a printer is used as an image processing apparatus. Note that other image processing apparatuses such as a digital copying machine or a multifunction apparatus may be used as the image processing apparatus.

The number of printers is not limited to that shown in FIG. 1, but the print system may include a greater number of printers.

In the print system shown in FIG. 1, information is transmitted among devices in a manner described below.

In FIG. 1, a host 100, a printer 200, and a server 300 are connected to each other via a communication medium 900 such that they can communicate with each other. In the present example of the system, the communication medium 900 is assumed to be a local area network (LAN). Note that the server 300 may be located on another network connected via a router.

The server 300 has a common key 600 for HMAC (keyed-Hashing for Message Authentication Code) stored in a storage device disposed in the server 300. The communication medium 900 is capable of performing an encryption process or a digital signature process to prevent data from being tapped or tampered with.

Note that the print system does not necessarily need to have the capability of performing the encryption process or the digital signature process to prevent data from being tapped or tampered with.

If a user performs printing by executing an application program on the host 100, then the host 100 produces log information 400 such as that shown in diagram 3 and transmits it to the server 300 via the communication medium 900. As described above, the host 100 has a log transmission capability (S102 in FIG. 9) thereby to transmit the log information 400 such as that shown in FIG. 3 to the server 300.

The log information includes environment information associated with the host 100, a print user name, a character string included in each page, and a page image. The log information 400 according to the present embodiment will be described in further detail below with reference to FIG. 3.

The server 300 issues a UUID (Universally Unique Identifier) associated with the log information 400. The UUID is unique identification information (ID) automatically generated by combining a generation date/time, a MAC address (Media Access Control address) of a network card and a random number.

Furthermore, the server 300 produces a MAC (Message Authentication Code) value based on a HMAC common key 600 stored in the storage device and an arbitrary hash value of the UUID. The MAC value functions as authentication information used to authenticate the UUID issued by the server 300. The MAC value is given by a hash value calculated using an arbitrary hash function according to a hash algorithm. Hash functions usable for this purpose include HMAC-MD5, HMAC-SHA1, etc.

The server 300 checks whether the UUID is valid by calculating the MAC value using the same method as that used to produce the MAC value associated with the UUID and comparing the calculated MAC value with the MAC value transmitted together with the UUID from the printer 200.

The information 700A including the produced UUID and the MAC value is transmitted from the server 300 to the host 100 via the communication medium 900. The information 700A including the produced UUID and the MAC value has a data structure such as that shown in FIG. 4.

The host 100 produces job information 500 in which information 700 including the UUID and the MAC value received from the server 300 via the communication medium 900 is described, and the host 100 transmits the produced job information 500 to the printer 200 via the communication medium 900. The job information 500 is produced so as to have a data structure including data described using a PDL (Page Description Language) as shown in FIG. 6.

Figure 6:
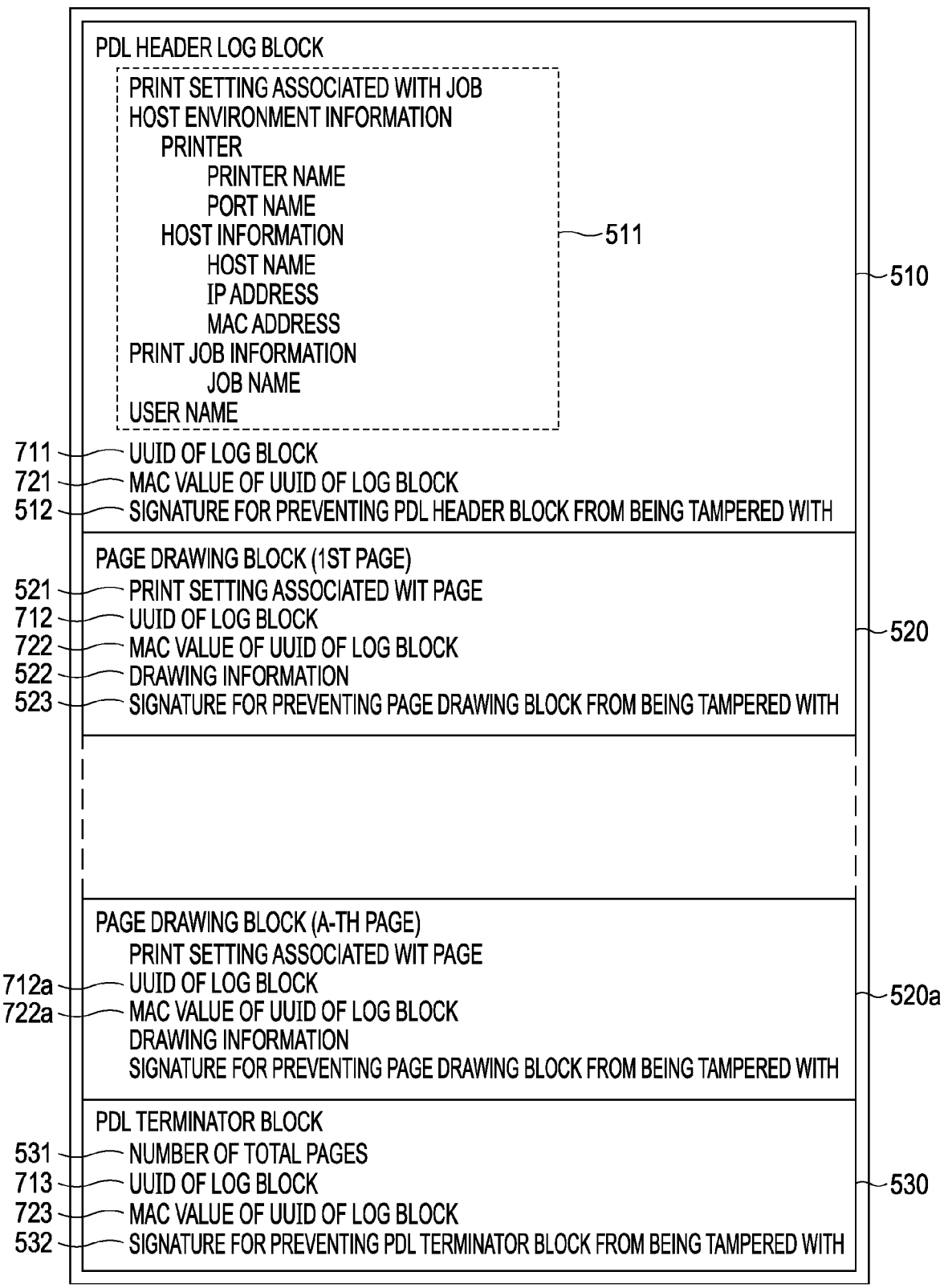
FIG. 6 is a diagram illustrating a data structure of PDL data transmitted from a host to a printer.

The host 100 extracts the UUID and the associated MAC value from the information 700A received from the server 300, and host 100 incorporates the UUID 711 and the associated MAC value 721 of the log block into the job information 500 according to the data structure shown in FIG. 6. The data structure of the job information 500 will be described in detail below.

The printer 200 acquires information 700B including the UUID and the MAC value from the job information 500 received from the host 100 via the communication medium 900, and the printer 200 transmits the information 700B to the server 300.

From the information 700B including the UUID and the MAC value, the server 300 determines that the host 100 has acquired the log information and transmits the determination result as host log acquisition information 800 to the printer 200 via the communication medium 900. Note that the host log acquisition information refers to information indicating whether the log information has been acquired by the host.

The printer 200 analyzes the host log acquisition information 800 received from the server 300 via the communication medium 900 to determine whether the log information has been acquired by the host 100. If so, the printer 200 performs printing according to the job information 500 received from the host 100.

On other hand, in a case where the host log acquisition information 800 indicates that the acquisition of the log information by the host 100 has not been performed, the printer 200 produces log information 405 and transmits it to the server 300.

Note that the content and the data structure of the log information 405 may or may not be the same as those of the log information 400.

The transmission of the log information 405 from the printer 200 may be performed before or after the printing. The printer 200 may temporarily store the log information 405 in a storage area of a memory, an HDD, or the like in the printer 200, and may transmit the temporarily stored log information 405 to the server 300 at a time asynchronous to the printing.

Figure 2:
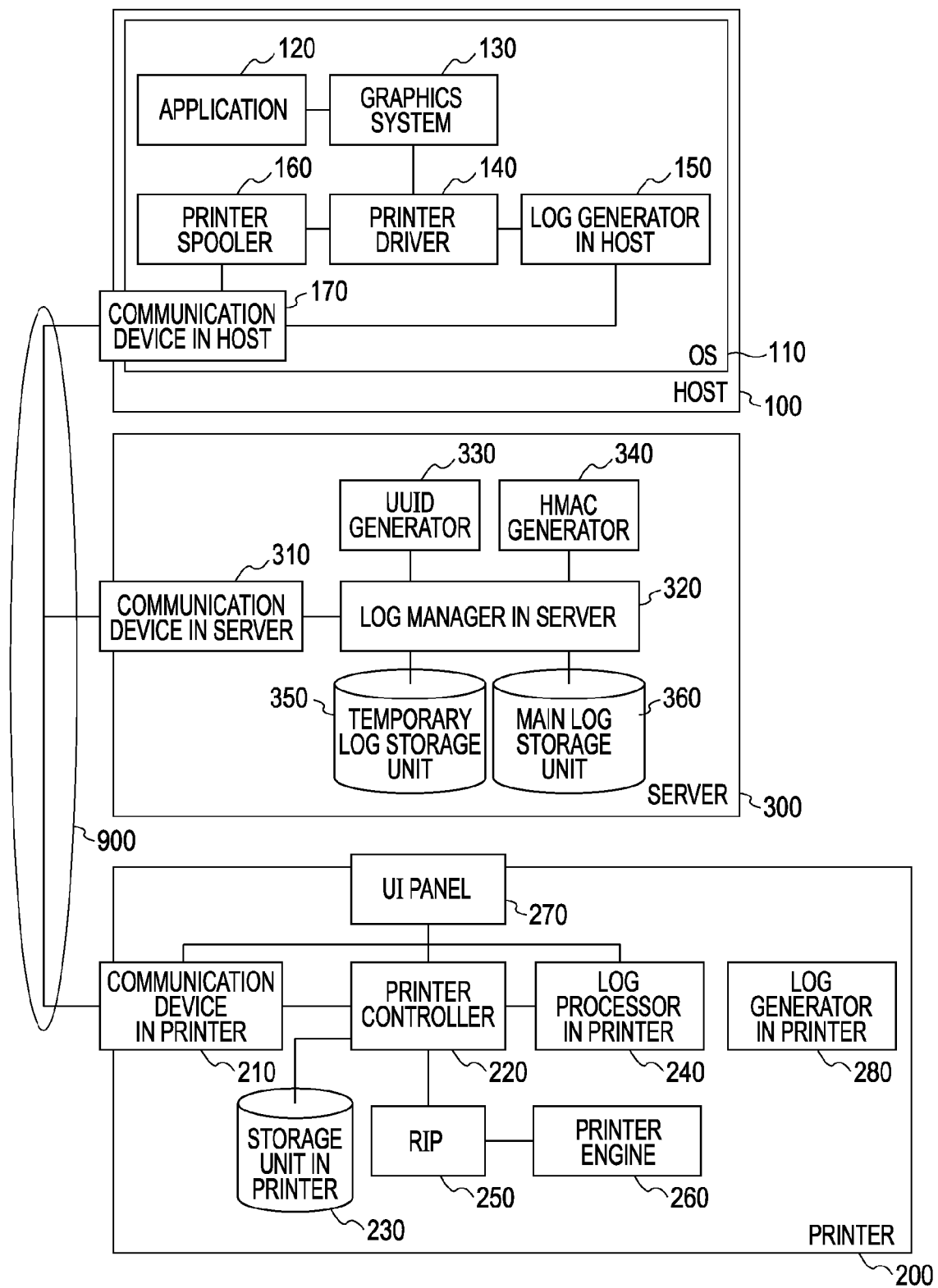
FIG. 2 is a block diagram illustrating module configurations of a host, a printer, and a server in a print system.

FIG. 2 is a block diagram illustrating a module configuration of the host 100, the printer 200, and the server 300 in the print system shown in FIG. 1. In FIG. 2, similar parts to those in FIG. 1 are denoted by similar reference numerals.

In the present embodiment, the print system is configured such that the host 100, the printer 200, and the server 300 are connected to the communication medium 900 via a host communication device 170, a server communication device 310, and a printer communication device 210, respectively, thereby providing a data communication capability.

In this print system, the host 100 and the server 300 are capable of communicating with each other in both directions, and the printer 200 and the server 300 are capable of communicating with each other in both directions.

Note that the communication between the host 100 and the printer 200 does not necessarily need to be performed in both directions, but the host 100 and the printer 200 may be connected such that only one-way communication from the host 100 to the printer 200 is allowed.

To prevent data from being tapped or tampered with, encryption or digital signature may be used in the communication among the host communication device 170, the printer communication device 210, and the server communication device 310.

Note that in the print system according to the present embodiment of the invention, it is not necessarily need to perform encryption or digital signature to prevent data from being tapped or tampered with.

All modules in the host 100 operates on an operating system 110. This makes it possible to use an input device such as a keyboard or a mouse (not shown), an output device such as a monitor, a storage device such as a hard disk or a RAM, etc.

If a user executes a print command using an application 120 on the host 100, printing is started.

The application 120 starts a printing operation by calling a graphics system 130 provided by the operating system (OS) 110.

The graphics system 130 has a universal drawing interface that is provided to the application 120. This makes it possible for the application 120 to operate correctly regardless of what printer is used.

The graphics system 130 manages printer drivers 140 for respective printers. The printer drivers 140 have a capability of producing job information 500 depending on the printers. The graphics system 130 produces job information 500 depending on a specific printer by calling a corresponding printer driver 140.

In the present embodiment, the printer driver 140 also has a host log generator 150.

Figure 3:
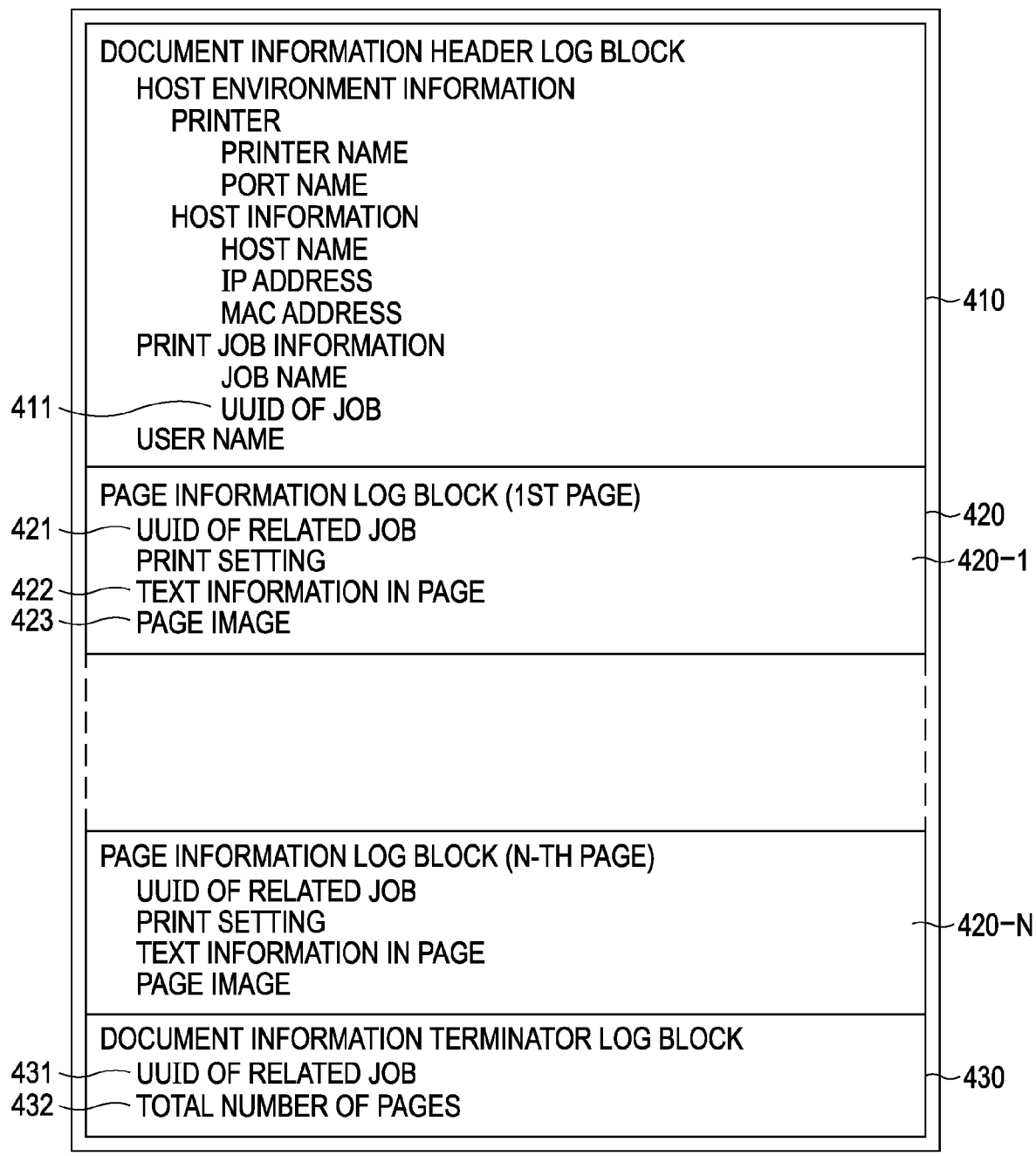
FIG. 3 is a diagram illustrating a data structure of log information transmitted from a printer to a server.

When the printer driver 140 generates the job information 500, the host log generator 150 generates log information 400 such as that shown in FIG. 3 and transmits it to the server 300 via the host communication device 170.

The host log generator 150 also transfers received information 700 including the UUID and the MAC value of the server 300 shown in FIG. 1 to the printer driver 140.

The printer driver 140 generates the job information 500 in which the information 700 including the UUID and the MAC value received from the server 300 is described.

The printer driver 140 collects the generated job information 500 in a printer spooler 160. Thereafter, the printer driver 140 transmits the job information 500 to the printer 200 via the host communication device 170.

The printer 200 is connected to the communication medium 900 via the printer communication device 210.

The printer 200 receives the job information 500 from the host 100 via the printer communication device 210. The received job information 500 is processed by a printer controller 220 and interpreted into a form that can be used by a RIP (Raster Image Processor) 250 to produce a raster image. After the data is interpreted into the above-described form as required, the resultant data is temporarily stored in the storage device 230 in the printer.

Although the data format of the data is concerned with a basic printing operation, the data format is not essential to the present invention, and thus a further description thereof is omitted.

The data interpreted into the form usable by the RIP 250 is converted by the RIP 250 into bitmap image data. The RIP 250 transfers the resultant bitmap image data to a printer engine 260 thereby to make it possible to print on a print medium such as paper.

The printer 200 has a UI panel 270 connected to a printer controller 220 thereby to display a printing status. The UI panel 270 is also used to set/change printing parameters.

Furthermore, in the present embodiment, a printer log processor 240 and a print log generator 280 are connected to the printer controller 220.

When PDL analysis is performed, the printer log processor 240 receives the information 700B including the UUID and the MAC value from the printer controller 220.

The printer log processor 240 transmits the information 700B including the UUID and the MAC value to the server 300 via the printer communication device 210.

The printer log processor 240 receives host log acquisition information 800 from the server 300 via the printer communication device 210.

The print log generator 280 transmits information (including the UUID and the MAC value) extracted by the printer controller 220 from the job information 500 and the draw data converted by the RIP 250 to the server 300 via the printer communication device 210.

The server 300 is connected to the communication medium 900 via the server communication device 310.

If the server 300 receives the log information 400 from the host 100, the server 300 generates information 700 including the UUID and the MAC value by a server log manager 320, and transmits it to the host 100 via the server communication device 310. In this process, the server log manager 320 generates the UUID identifying the log by using a UUID generator 330.

The server log manager 320 generates the MAC value (hash value) for the UUID by using an HMAC (keyed-Hashing for Message Authentication Code) generator 340. Note that a common key for HMAC used in generating the MAC value is stored in the main log storage unit 360. Note that the main log storage unit 360 stores the log information in a storage area different from the storage area used by the temporary log storage unit 350.

Furthermore, the server log manager 320 temporarily stores the log information 400 in association with the UUID in the temporary log storage unit 350. The temporary log storage unit 350 functions as a temporary storage area used by the server log manager 320 to temporarily store the log information 400 received from the host 100.

If the server 300 receives the information 700B including the UUID and the MAC value transmitted from the printer 200 via the communication medium 900, then the server log manager 320 verifies the UUID and MAC value.

The server log manager 320 then determines whether the log information 400 related to the UUID is stored in the temporary log storage unit 350, and transmits the determination result as host log acquisition information 800 to the printer 200 via the communication medium 900.

In a case where the log information of interest is found, the server log manager 320 moves the detected log information from the temporary log storage unit 350 to the main log storage unit 360.

In the present embodiment, as described above, on the basis of the information 700A including the UUID and the MAC value generated by the server 300, the host 100 generates the job information 500 including information associated with the UUID and the MAC value via the printer driver 140 and transmits it to the printer 200.

The printer 200 extracts the UUID and the MAC value from the job information 500 received from the host 100 and transmits information 700B including the extracted UUID and the MAC value to the server 300. From the information 700B received from the printer 200, the server 300 can determine the storage status of the log information 400 received from the host 100.

This prevents the server 300 from receiving duplicated log information from the host 100 and the printer 200 and storing the duplicated log information in the storage device in the server 300.

FIG. 3 is a diagram illustrating a data structure of the log information 400 transmitted from the printer 200 to the server 300 shown in FIG. 2.

In the example shown in FIG. 3, the log information 400 includes three types of log blocks.

A first log block is a document information header log block 410, which is located at the beginning of the log information 400.

The document information header log block 410 includes information uniquely specified for the print job, such as a port name of a printer to be used for the print job, a printer name, host environment information such as a host name, print job information such as a job name, the UUID of the job, etc. The host environment information includes an IP address and a MAC address.

The first log block has a UUID 411 associated with the job thereby to allow the following log blocks to be related to the job.

A second type of log block is page information log block 420 located after the document information header log block 410. If the job includes a plurality of pages, as many page information log blocks 420 are located as there are pages in the job.

That is, the page information log blocks 420 include a plurality of page information log blocks 420-1 to 420-N. Each of the page information log blocks 420-1 to 420-N has a job UUID 421 with the same value as that of the UUID 411 of the related job thereby to indicate the related job.

Each page information log block 420 includes setting values specifying printing conditions such as a monochrome/color printing mode for the corresponding page. Each page information log block 420 may further include text information 422 or a page image 423 included in the corresponding page, as required.

The page image 423 is used for confirmation, and the resolution thereof may be lower than a print resolution. The page image 423 functions as an image log based on image data to be printed by the printer 200.

A third log block is a document information terminator block 430 located at the end of the log information 400.

The document information terminator block 430 has a job UUID 431 with the same value as that of the UUID 411 of the related job thereby to indicate the related job. The document information terminator block 430 includes data 432 indicating the total number of pages of the job.

Referring again to FIG. 2, the print system is further described below as to its configuration.

To prevent a log acquisition error due to, for example, a communication error, the host 100 confirms that log information associated with a page has been registered in the server 300. If it is confirmed that the log information has been successfully registered, then the host 100 transmits the job information 500 associated with that page to the printer 200.

If the job information 500 is transmitted to the printer 200 after all log information 400 associated with the job is registered in the server 300, there is a large delay before printing of a first page is started.

To avoid the above problem, the log information 400 is configured to have a block structure as shown in FIG. 3. The host 100 registers the log information 400 on a block-by-block basis in the server 300, and issues the job information 500 corresponding to each block to the printer 200 after the block is registered. The server 300 issues the information 700 including the UUID and the MAC value to the host 100 for each block.

FIG. 4 is a diagram illustrating a data structure of information 700A (or information 700B) including the UUID and the MAC value shown in FIG. 1. The information 700A including the UUID and the MAC value is generated by the server 300 and returned to the host 100, while the information 700B including the UUID and the MAC value is returned from the printer 200 to the server 300.

In FIG. 4, the information 700A (or 700B) including the UUID and the MAC value includes UUID 710 associated with a log block and a MAC value 720 associated with the UUID 710 of the log block.

The information 700A including the UUID and the MAC value is used in the communication from the server 300 to the host 100, while the information 700B including the UUID and the MAC value is used in the communication from the printer 200 to the server 300.

In the present embodiment, the information 700A used in the communication from the server 300 to the host 100 and the information 700B used in the communication from the printer 200 to the server 300 have the same data structure. Note that the information 700A or the information 700B may include other information.

For example, in communication from the printer 200 to the server 300, the information 700B may further include a printer name thereby to identify the printer to be used.

In the following explanation, for convenience, MAC values corresponding to the respective UUIDs 711, 712, and 713 of the log blocks are denoted by reference numerals 721, 722, and 723.

FIG. 5 is a diagram illustrating a data structure of log information stored in the temporary log storage unit 350 shown in FIG. 2.

More specifically, in the present example, the UUID 710 of the log is stored in the temporary log storage unit 350 thereby to manage the log information 400.

When the log information 400 is temporarily stored in association with the UUID 710 in the temporary log storage unit 350, the server log manager 320 adds a record.

The server log manager 320 checks whether the log information 400 associated with the UUID has been stored in the temporary log storage unit 350.

If the server log manager 320 determines that the log information 400 has been stored in the temporary log storage unit 350, the server log manager 320 moves the log information 400 into the main log storage unit 360.

In the present example shown in FIG. 5, the document information header log block 410, the page information log block 420, and the document information terminator block 430 are managed using the UUIDs 711, 712, and 713 assigned thereto.

To prevent the temporary log storage unit 350 from having an overflow, a validity period may be defined for each record.

FIG. 6 is a diagram illustrating a data structure of the job information 500 transferred from the host 100 to the printer 200 shown in FIG. 1. In this example, the job information 500 includes information described using the PDL.

In the present embodiment, like the log information 400, the job information 500 includes three types of blocks.

A first block is a PDL header block 510 which is located at the beginning of the job information 500. The PDL header block 510 is a block corresponding to the document information header log block 410 of the log information 400.

The PDL header block 510 includes information 511 associated with the document information header log block 410.

In addition, in the present embodiment, the PDL header block 510 also includes the UUID 711 of the document information header log block 410 and the MAC value 721 thereof.

A second block is a page draw block 520 located after the PDL header block 510. If the job includes a plurality of pages, as many page draw block 520 are located as there are pages in the job. In FIG. 6, 520*a* denotes a last page draw block.

The page draw block 520 corresponds to the page information log block 420. The page draw block 520 includes information 521 specifying printing conditions such as a monochrome/color printing mode, and draw information 522 representing an actual page of interest. The draw information 522 may be given by standard PDL draw commands, and there is no particular restriction on the PDL draw commands.

In addition, in the present embodiment, the page draw block 520 also includes the UUID 712 associated with the page information log block 420 and the MAC value 722 thereof. Similarly, each page draw block includes a UUID and a MAC value. For example the last page draw block 520*a* includes a UUID 712*a* and a MAC value 722*a*.

A third block is a PDL terminator block 530 located at the end of the job information 500.

The PDL terminator block 530 is a block corresponding to the document information terminator block 430. The PDL terminator block 530 includes data 531 indicating the total number of pages of the job information 500.

In addition, in the present embodiment, the PDL terminator block 530 also includes the UUID 713 associated with the document information terminator block 430 and the MAC value 723 thereof.

To prevent the PDL blocks from tampering, digital signatures 512, 523, and 532 given by MAC values of the PDL blocks are stored in the respective blocks.

In the present embodiment, a digital signature is stored in each block. Alternatively, a digital signature is provided for each predetermined data size.

FIG. 7 is a diagram illustrating a data structure of the host log acquisition information 800 provided to the printer 200 from the server 300 shown in FIG. 2.

In FIG. 7, the host log acquisition information 800 is data indicating whether log information has been provided from the host 100 to the server 300, and the host log acquisition information 800 includes log acquisition information 810 having one of values "ACQUIRED" or "NOT ACQUIRED".

Figure 8:
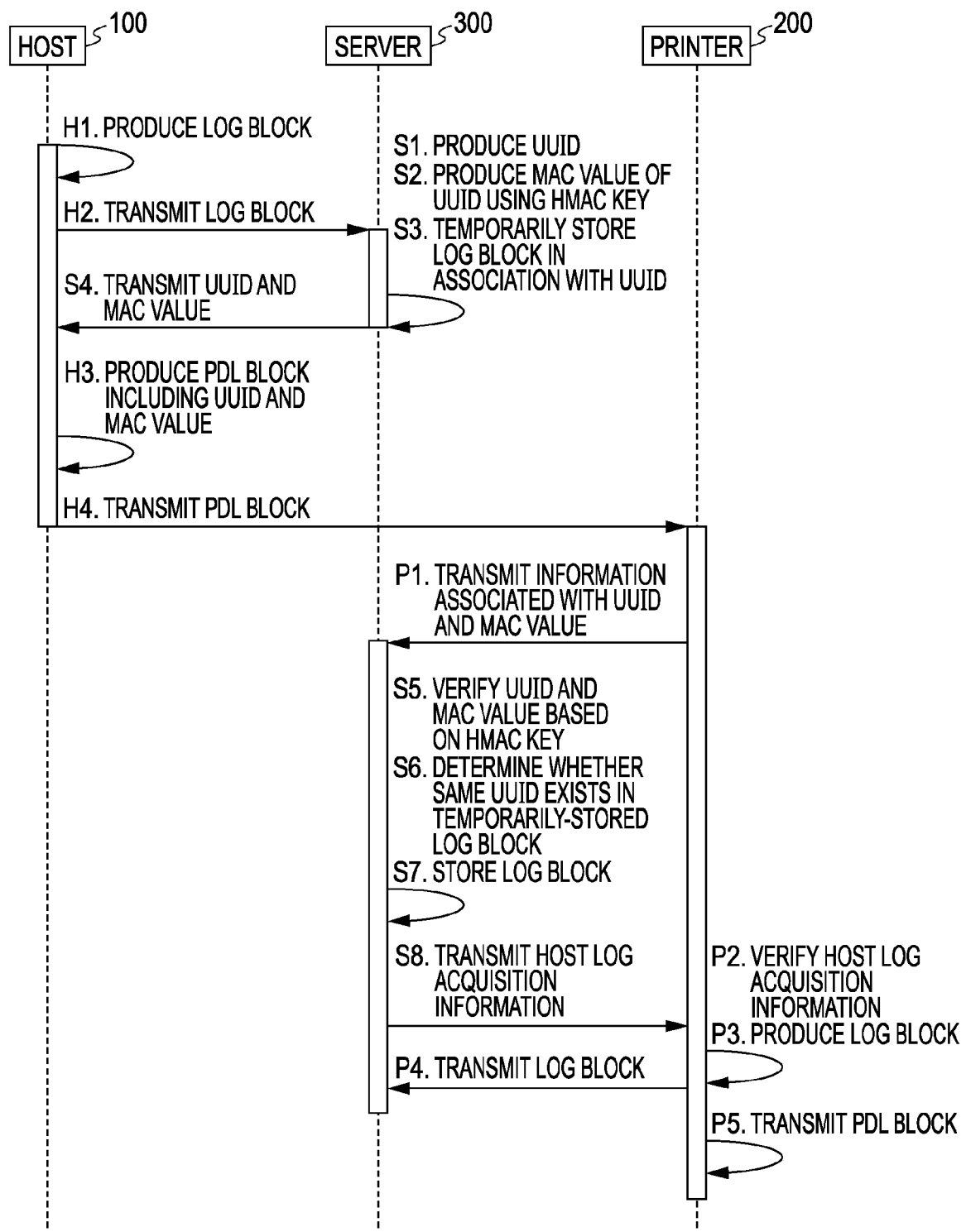
FIG. 8 is a diagram illustrating an example of a sequence performed by a host, a printer, and a server.

FIG. 8 is a diagram illustrating an example of a first sequence performed by the host 100, the printer 200, and the server 300 shown in FIG. 2. More specifically, FIG. 8 illustrates a data flow in a normal operation. In FIG. 8, H1 to H4 denote steps performed by the host 100. S1 to S8 denote steps performed by the server 300. P1 to P5 denote steps performed by the printer 200.

In FIG. 8, in step H1, the host 100 generates blocks described a flow using the host log generator 150 in accordance with a print command issued by a user. That is, the host log generator 150 generates a document information header log block 410, a page information log block 420, or a document information terminator block 430, such as those shown in FIG. 5.

Next, in step H2, the host 100 transfers the block generated by the host log generator 150 to the server 300 via the host communication device 170. Note that the block transferred by the host 100 to the server 300 is one of the followings: the document information header log block 410, the page information log block 420, or the document information terminator block 430.

On the other hand, in step S1, the server 300 receives the document information header log block 410, the page information log block 420, or the document information terminator block 430, such as those shown in FIG. 5, from the host 100 via the server communication device 310.

Using the UUID generator 330, the server log manager 320 generates a UUID 711, UUID 712, or UUID 713 associated with the received document information header log block 410, the page information log block 420, or the document information terminator block 430, such as those shown in FIG. 5.

In step S2, using the HMAC generator 340, the server 300 generates the MAC value 721, 722, or 723 using the HMAC common key. Note that the MAC values 721, 722, and 723 of the UUIDs are given by hash values.

Next, in step S3, the server 300 temporarily stores the block in the data structure shown in FIG. 8 in the temporary log storage unit 350 in association with the UUID 711, 712, or 713. Note that the temporarily stored block is one of the followings: the document information header log block 410, the page information log block 420, or the document information terminator block 430.

In step S4, the server 300 transmits the UUID 711, 712, or 713 and the corresponding MAC value 721, 722, or 723, in the data structure shown in FIG. 4, to the host 100.

In step H3, using the printer driver 140, the host 100 generates a PDL header block 510, a page draw block 520, or a PDL terminator block 530 such as those shown in FIG. 6. The PDL header block 510, the page draw block 520, and the PDL terminator block 530 include the UUID 711, 712, or 713 and the corresponding MAC value 721, 722, or 723.

In step H4, the host 100 transmits the PDL header block 510, the page draw block 520, or the PDL terminator block 530, such as those shown in FIG. 6, to the printer 200.

The printer 200 receives the PDL header block 510, the page draw block 520, or the PDL terminator block 530 from the host 100 via the printer communication device 210.

The received PDL header block 510, the page draw block 520, or the PDL terminator block 530 is transferred to the printer controller 220 and interpreted thereby.

The printer controller 220 transfers the UUID 711, 712 or 713 and the corresponding MAC value 721, 722 or 723 to the printer log processor 240. In step P1, the printer log processor 240 transmits the information 700 including the UUID and the MAC value in the data structure shown in FIG. 4 to the server 300 via the printer communication device 210.

In step S5, using the HMAC generator 340, the server 300 generates a MAC' value (a hash value) according to the HMAC common key for the UUID 711, 712 or 713 received from the printer 200 via the server communication device 310.

The server 300 compares the generated MAC' value with the MAC value included in the log information 400 (stored in the temporary log storage unit 350) received from the host 100 thereby to determine whether the UUID is the same as that issued by the server 300. If the server 300 determines that the generated MAC' value is equal to the MAC value included in the received log information 400, it is determined that the UUID is the valid UUID issued by the server 300. However, if the generated MAC' value is not equal to the MAC value included in the received log information 400, it is determined that the UUID is not the valid UUID issued by the server 300.

In step S6, the server 300 searches for a record corresponding to the UUID 711, 712, or 713 received from the printer 200 from the log information 400 stored in the data structure shown in FIG. 5 in the temporary log storage unit 350.

If the server 300 determines that a record of interest is stored in the temporary log storage unit 350, it is determined that the log has been issued by the host 100.

If a record of interest is detected in the temporary log storage unit 350, then, in step S7, the server 300 moves the log block of the record into the main log storage unit 360.

As a result, the record described above is deleted from the temporary log storage unit 350. This means that, if a user issues the job information 500 a plurality of times by copying it, no log block can be found in the temporary log storage unit 350 for the PDL data issued in second and following issuing operations. This makes it possible for the server 300 to determine that the print request associated with the job information 500 from the host 100 is invalid.

In step S8, from the results in steps S6 and S7, the server 300 determines whether the log information 400 generated by the host 100 for the job information 500 received by the printer 200 is stored in the server 300.

The server 300 describes the determination result in the host log acquisition information 800 and transmits it to the printer 200 via the server communication device 310.

In step P2, the printer 200 receives the host log acquisition information 800 generated by the server 300 via the printer communication device 210.

The printer 200 determines whether "ACQUIRED" is set in the log acquisition information 810 of the host log acquisition information 800. If so, steps P3 and P4 are skipped, and the process proceeds to step P5.

On the other hand, in a case where it is determined that "NOT ACQUIRED" is set in the log acquisition information 810, then, in step P3, using the print log generator 280. The printer 200 generates a document information header log block 410, a page information log block 420, or a document information terminator block 430.

In step P4, the printer 200 transfers the generated document information header log block 410, the page information log block 420, or the document information terminator block 430 to the server 300 via the printer communication device 210.

In step P5, the printer controller 220 performs printing using the RIP 250.

The job information 500 including the UUID and the MAC value generated by the server 300 for the log information 400A generated by the host 100 is transferred to the printer 200. In the above process, if the UUID and the MAC value of the PDL data are equal to those included in the log information stored in the server 300, the sequence is performed normally.

In the normal sequence, the printer 200 does not generate log information. Thus, it is possible to prevent the server 300 from acquiring duplicated log information from the printer 200 and storing it in the main log storage unit 360.

In the sequence described above, steps are performed in order S6→S7. However, these two steps may be performed in an opposite order.

Figure 9:
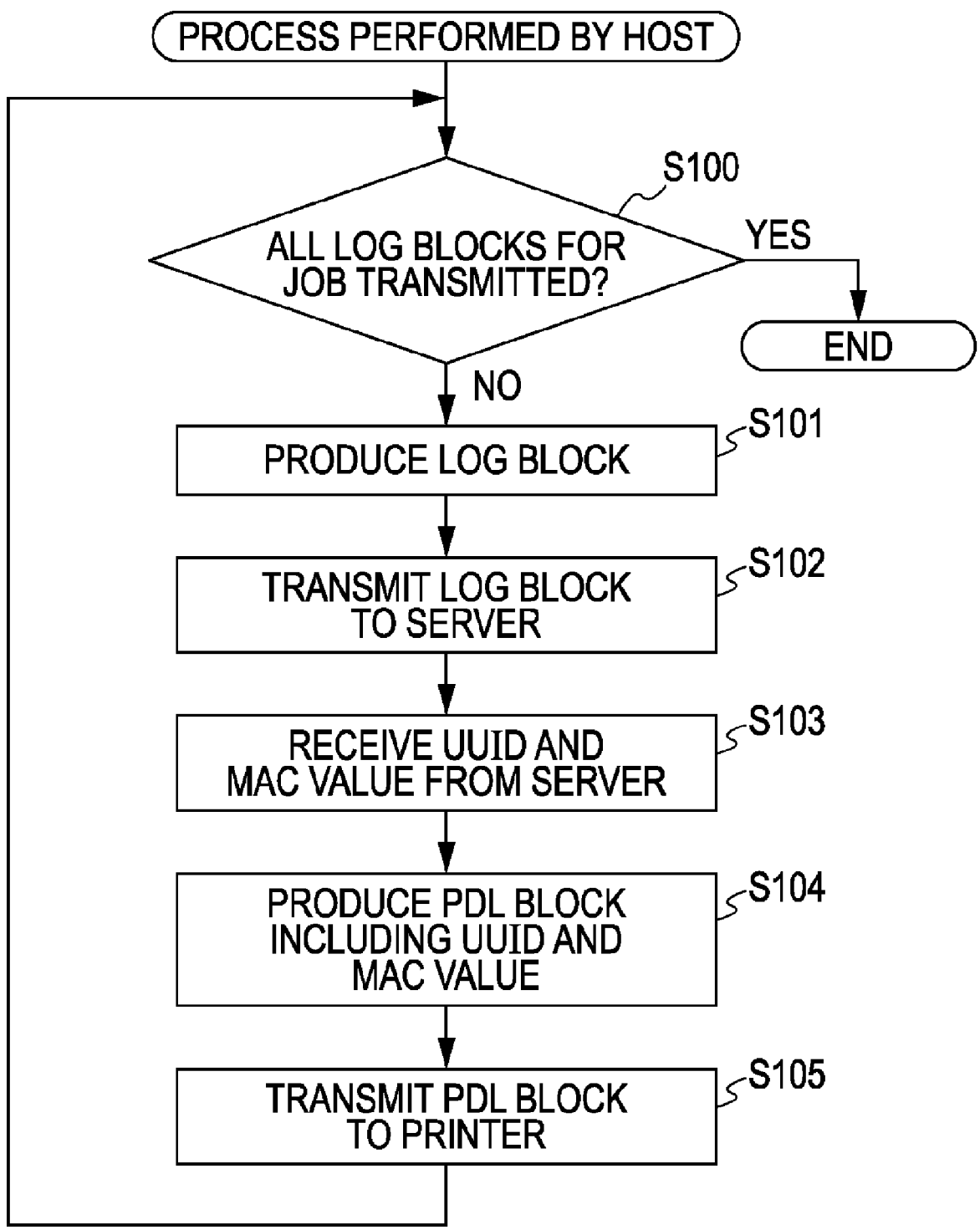
FIG. 9 is a flow chart illustrating an example of a data processing procedure performed by an information processing apparatus according to an embodiment of the present invention.

FIG. 9 is a flow chart illustrating an example of a first data processing procedure performed by the information processing apparatus according to the present embodiment of the invention. More specifically, this data processing procedure is performed by the host 100 in response to a print command issued by a user via an application. In FIG. 9, S100 to S105 denote steps of the procedure. These steps are executed by a CPU of the host 100 shown in FIG. 2 by loading modules in the RAM and executing them. The modules include the host log generator 150, the printer driver 140, the printer spooler 160, etc., shown in FIG. 2.

In step S100, the printer spooler 160 of the host 100 determines whether the transmission to the server 300 is completed for an entire block, for example, the document information header log block 410, the page information log block 420, or document information terminator block 430.

In a case where the printer spooler 160 of the host 100 determines that the document information header log block 410, the page information log block 420, or the document information terminator block 430 has been entirely transmitted to the server 300, the present process is ended.

On the other hand, in case where the determination in step S100 by the printer spooler 160 is that the document information header log block 410, the page information log block 420, or document information terminator block 430 has not been entirely transmitted to the server 300, the process proceeds to step S101.

In step S101, using the host log generator 150, the host 100 generates a document information header log block 410, a page information log block 420, or a document information terminator block 430. Each of the document information header log block 410, the page information log block 420, and the document information terminator block 430 generated by the host log generator 150 has the data structure shown in FIG. 3 as described in detail above.

Next, in step S102, using the host communication device 170, the printer driver 140 of the host 100 transmits, to the server 300, the block generated in step S101, for example, the document information header log block 410, the page information log block 420, or the document information terminator block 430. The host 100 then waits until the information 700 including the UUID and the MAC value is received from the server 300.

In step S103, the information 700 including the UUID and the MAC value is received from the server 300 via the host communication device 170. The information 700 including the UUID and the MAC value has the data structure shown in FIG. 4 as described in detail above.

Next, in step S104, using the printer driver 140, the host 100 generates a PDL header block 510, a page draw block 520, or a PDL terminator block 530 each including the UUID the MAC value described in the information 700.

The job information 500 has the data structure shown in FIG. 6 as described in detail above.

Next, in step S105, the PDL header block 510, the page draw block 520, or the PDL terminator block 530 generated in step S104 is transmitted to the printer 200 via the host communication device 170. The processing flow then returns to step S100 to repeat the process described above. Note that the process in step S105 of transmitting the job information 500 including the UUID and the MAC value to the printer 200 corresponds to the job transmission function of the host 100.

Figure 10:
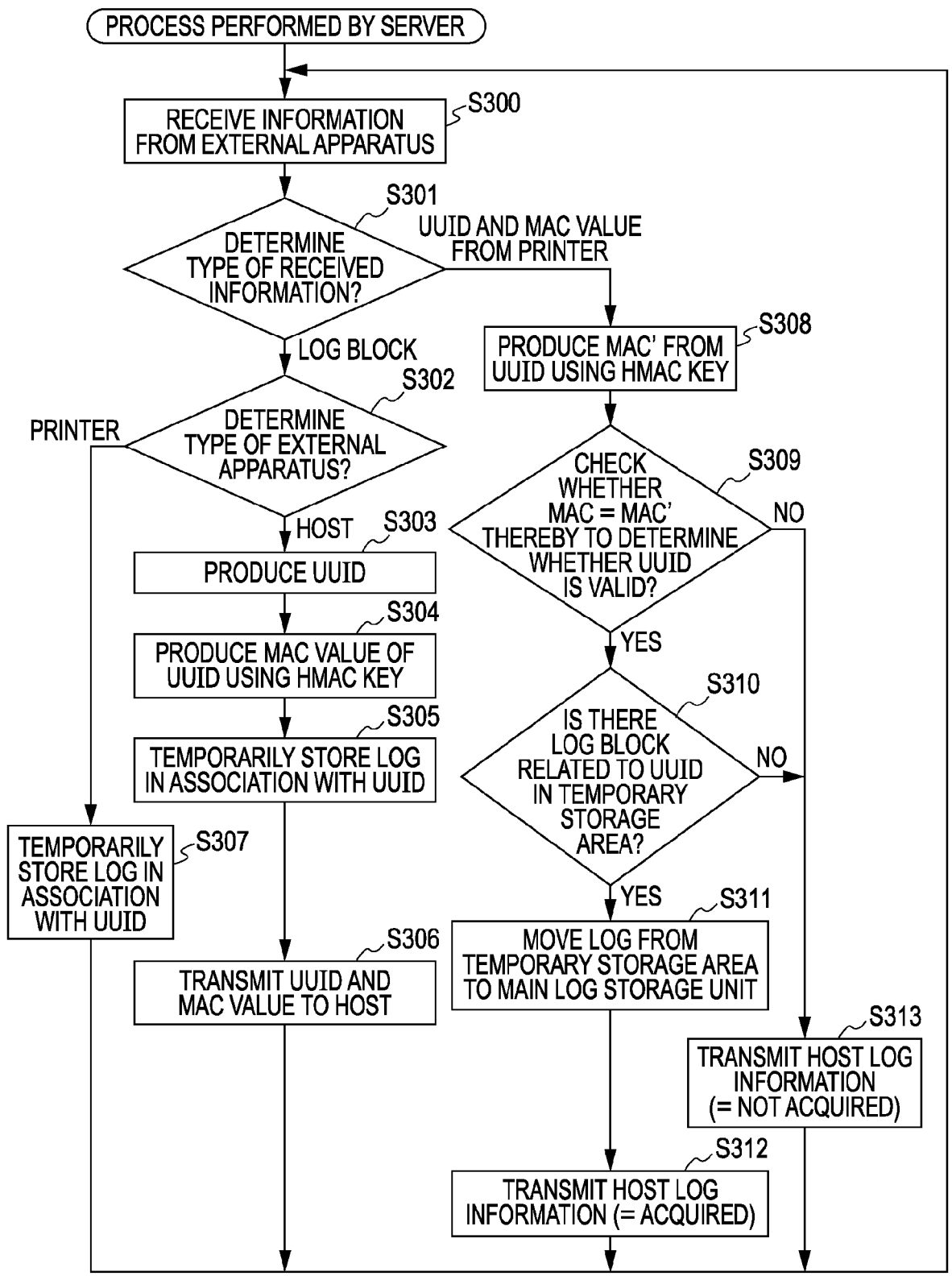
FIG. 10 is a flow chart illustrating an example of a data processing procedure performed by a server apparatus according to an embodiment of the present invention.

FIG. 10 is a flow chart illustrating an example of the first data processing procedure performed by the server apparatus according to the present embodiment of the invention. More specifically, this data processing procedure is performed by the server 300 shown in FIG. 2. In FIG. 10, S300 to S313 denote steps of the procedure. These steps are performed by the CPU of the server 300 by operating the server log manager 320.

In step S300, the server 300 receives information from an external apparatus via the server communication device 310. Next, in step S301, the server log manager 320 determines the type of information received from the external apparatus. In the present embodiment, the external apparatus is either the printer 200 or the host 100.

In a case where the result of the determination made by the server log manager 320 is that the information received from the host 100 or the printer 200 is the document information header log block 410, the page information log block 420, or the document information terminator block 430, then the process proceeds to step S302.

On the other hand, if the determination made in step S301 by the server log manager 320 is that the received information is the information 700 including the UUID and the MAC value transmitted from the printer 200, then the process proceeds to step S308.

In step S302, the server log manager 320 determines the type of the external apparatus that has received the document information header log block 410, the page information log block 420, or the document information terminator block 430. If the determination made by the server log manager 320 is that the log block has been received from the host 100, then the process proceeds to step S303.

On the other hand, if the determination made in step S302 by the server log manager 320 is that the document information header log block 410, the page information log block 420, or the document information terminator block 430 has been received from the printer 200, then the process proceeds to step S307.

In step S303, using the UUID generator 330, the server 300 generates a UUID for the document information header log block 410, the page information log block 420, or the document information terminator block 430 received from the host 100.

In step S304, using the HMAC generator 340, the server 300 generates a MAC value (a hash value) associated with the UUID generated in step S303. In this process performed by the HMAC generator 340 to generate the MAC value, the HMAC common key 600 stored in the main log storage unit 360 is used.

In step S305, using the server log manager 320, the server 300 stores the record of the block related to the UUID in the data structure shown in FIG. 5 in the temporary log storage unit 350. Herein, the block is one of the followings: the document information header log block 410, the page information log block 420, and the document information terminator block 430.

In step S306, using the server log manager 320, the server 300 combines the UUID and the MAC value thereof generated in steps S303 and S304 into the information 700A including the UUID and the MAC value having the data structure shown in FIG. 4. The server 300 then transmits the information 700A including the UUID and the MAC value to the host 100 via the server communication device 310. The process then returns to step S300 to wait for next information to be received from an external apparatus. In the above process, the server log manager 320 transmits the generated UUID and MAC value to the host 100 as a response to the log information 400A transmitted from the host 100.

On the other hand, in a case where the process proceeds to step S307, the server 300 stores the record of block in the main log storage unit 360 by using the server log manager 320. Note that the block stored in this process is the document information header log block 410, the page information log block 420, or the document information terminator block 430. Thereafter, the process returns to step S300.

In a case where the process proceeds from step S301 to step S308, the server 300 acquires the UUID from the information 700B including the UUID and the MAC value received from the printer 200 and generates a MAC' value using the HMAC generator 340.

Note that in the process of generating the MAC' value, the HMAC common key 600 stored in the main log storage unit 360 is used.

Next, in step S309, a MAC' value is generated from the information 700B including the UUID and the MAC value received in step S308 by the server log manager 320 from the printer 200. The generated MAC' value is compared with the MAC value temporarily stored in step S305 in the temporary log storage unit 350 to determine whether the MAC' value is equal to the MAC value. Note that when the server log manager 320 determines whether the log information acquired from the host 100 is stored in the temporary log storage unit 350 serving as the temporarily storage area, the determination is made on the basis of the UUID issued by the server 300 as follows.

That is, the server log manager 320 generates the MAC value and the MAC' value for the UUID stored in the temporary log storage unit 350 and for the UUID acquired from the information 700B supplied from the printer 200, by using the HMAC common key 600 serving as the HMAC key information stored in advance. The server log manager 320 then determines, in step S309 described below with reference to FIG. 10, whether the generated MAC value and the MAC' value are equal to each other. If the result of the determination made by the server log manager 320 is that the MAC value is not equal to the MAC' value, that is, if it is determined that the authentication fails, a message is sent to the printer 200 to notify that the authentication has failed. More specifically, the server log manager 320 performs an authentication information notification process such that "ACQUIRED" or "NOT ACQUIRED" is described in the log acquisition information 810 of the host log acquisition information 800 shown in FIG. 1 so as to indicate whether the log information has been acquired or not thereby to notify the printer 200 of the log acquisition status. In the case where the authentication fails, "NOT ACQUIRED" is described in the log acquisition information 810.

In a case where the server log manager 320 determines that the MAC value is equal to the MAC' value, that is, in a case where it is determined that the UUID is valid, the process proceeds to step S310.

On the other hand, in a case where the server log manager 320 determines in step S309 that the MAC value is not equal to the MAC' value, the process proceeds to step S313.

Thereafter, in step S310, the server log manager 320 of the server 300 determines whether a record associated with the UUID of interest is stored in the temporary log storage unit 350. If the server log manager 320 determines that a record associate with the UUID of interest is stored in the server log manager 320, that is, if the log information 400 acquired from the host 100 is registered in the server 300, the process proceeds to step S311.

In a case where the server log manager 320 determines in step S310 that there is no record associated with the UUID of interest, the process proceeds to step S313.

In step S311, the server log manager 320 moves the block described in the record of interest from the temporary log storage unit 350 into the main log storage unit 360. Note that the block is one the followings: the document information header log block 410, the page information log block 420, or the document information terminator block 430. As a result, the document information header log block 410, the page information log block 420, or the document information terminator block 430 is deleted from the temporary log storage unit 350.

In this case, the log has been correctly acquired by the host 100. Thus, in step S312, the server log manager 320 describes "ACQUIRED" in the log acquisition information 810 of the host log acquisition information 800. Thereafter, in step S313, the server log manager 320 transmits the host log acquisition information 800 to the printer 200 via the server communication device 310. The process then proceeds to step S300 to wait for next information to be received from the external apparatus.

In a case where the process proceeds to step S313 from step S309 or S310, that is, in a case where the log has not been correctly acquired by the host 100, "NOT ACQUIRED" is described in the log acquisition information 810 of the host log acquisition information 800. Subsequently, the server 300 transmits the host log acquisition information 800 to the printer 200 via the server communication device 310. Thereafter, in the process performed by the server 300, the flow returns to step S300 to wait for next information to be received from the external apparatus.

Note that in step S313, the server log manager 320 may notify an administrator via e-mail or the like that the log has not correctly acquired by the host 100.

Figure 11:
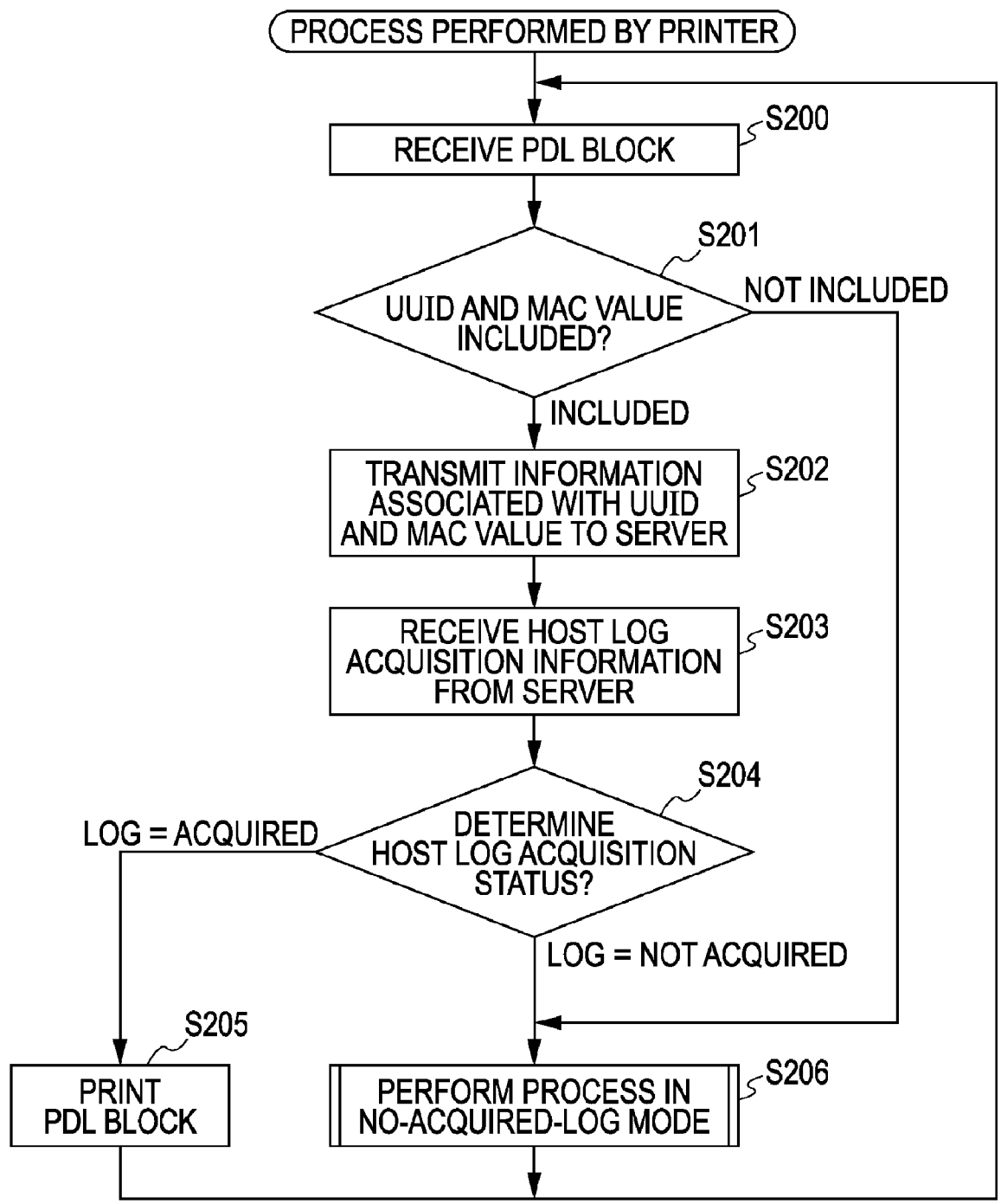
FIG. 11 is a flow chart illustrating an example of a data processing procedure performed by a printing apparatus according to an embodiment of the present invention.

FIG. 11 is a flow chart illustrating an example of the first data processing procedure performed by the printing apparatus according to the present embodiment of the invention. More specifically, this data processing procedure is performed by the printer 200 shown in FIG. 2. In FIG. 11, S200 to S206 denote steps of the procedure. These steps are executed by a CPU of the printer controller 220 of the printer 200 by loading modules in the RAM and executing them. The modules include the printer log processor 240, the print log generator 280, etc., shown in FIG. 2.

In step S200, the printer 200 receives the PDL header block 510, the page draw block 520, or the PDL terminator block 530 from the host 100 via the printer communication device 210.

Next, using the printer controller 220, the printer 200 interprets the PDL header block 510, the page draw block 520, or the PDL terminator block 530, and acquires the UUID and the MAC value. In step S201, the printer controller 220 determines whether the UUID and the MAC value have been acquired, for example, whether there are a UUID and a MAC value.

In a case where the printer controller 220 determines that the UUID and the MAC value have been acquired, the process proceeds to step S202. Otherwise, the process proceeds to step S206.

In step S202, using the printer log processor 240, the printer 200 generates information 700B including a UUID and a MAC value having the data structure shown in FIG. 4. The printer 200 then transmits the resultant information 700B including the UUID and the MAC value to the server 300 via the printer communication device 210.

In step S203, the printer 200 receives the host log acquisition information 800 from the server 300 via the printer communication device 210.

In step S204, the printer controller 220 determines whether the log acquisition information 810 described in the host log acquisition information 800 indicates that the log has already been acquired or has not been acquired by the host 100.

In case where the printer controller 220 determines that the log has already been acquired, the process proceeds to step S205. Otherwise, the process proceeds to step S206.

In the case where the process proceeds to step S205, it is determined that the log information 400 has been correctly transmitted to the server 300 from the host 100, and thus the printer controller 220 prints the block using the RIP 250. Note that the block is one of the followings: the PDL header block 510, the page draw block 520, or the PDL terminator block 530. The process then returns to step S200 to wait for next information to be received from an external apparatus.

In the case where the process proceeds to step S206, it is determined that the log information 400 has not transmitted from the host 100 to the server 300, and thus printer controller 220 performs a process in a no-acquired-log mode. The process then returns to step S200 to wait for next information to be received from the external apparatus.

The process in the no-acquired-log mode in step S206 is described below.

Figure 12:
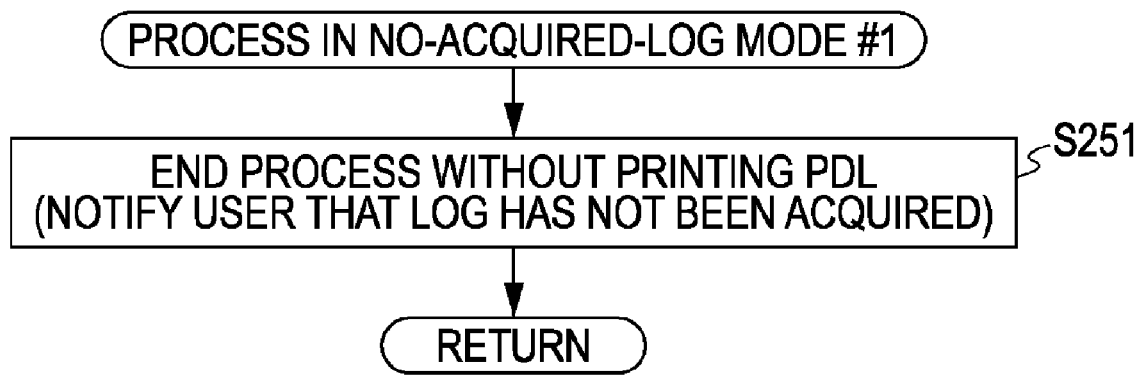
FIG. 12 is a flow chart illustrating an example of a data processing procedure performed by a printing apparatus according to an embodiment of the present invention.

FIG. 12 is a flow chart illustrating an example of a second data processing procedure performed by the printing apparatus according to the present embodiment of the invention. More specifically, this second data processing procedure shown in FIG. 12 is a detailed description of the process in the no-acquired-log mode in step S206 in FIG. 11. In FIG. 12, S251 denotes a step. This step is performed by the printer controller 220 of the printer 200 by loading modules in the RAM and executing them. The modules include the printer log processor 240, the print log generator 280, etc., as shown in FIG. 2.

In step S251, it is determined that the print request is invalid because the log information 400 is not sent to the server 300 from the host 100, and thus the printer 200 returns from the process without performing printing.

In this case, a message may be sent to a user or an administrator via a communication medium such as e-mail to notify that the log information 400 from the host 100 has not been acquired, and thus the printing has been cancelled.

Figure 13:
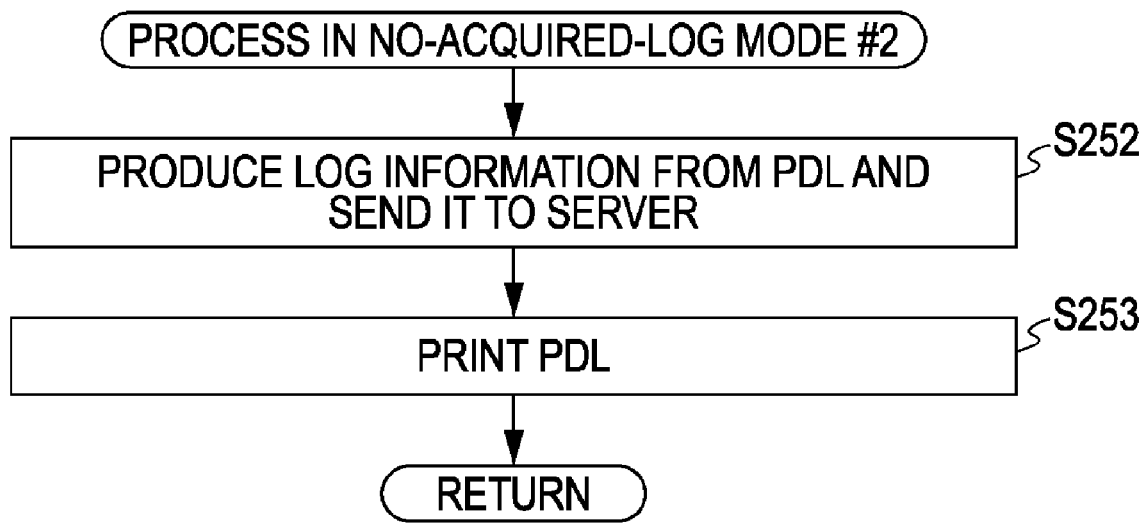
FIG. 13 is a flow chart illustrating an example of a data processing procedure performed by a printing apparatus according to an embodiment of the present invention.

FIG. 13 is a flow chart illustrating an example of a third data processing procedure performed by the printing apparatus according to the present embodiment of the invention. More specifically, this third data processing procedure shown in FIG. 13 is a detailed description of the process in the no-acquired-log mode in step S206 in FIG. 11. In FIG. 13, S252 and S253 denote the steps. These steps are executed by the CPU of the printer controller 220 of the printer 200 by loading modules in the RAM and executing them. The modules include the printer log processor 240, the print log generator 280, etc., as shown in FIG. 2.

In step S252, the printer 200 generates the log information 405 from the job information 500 and transmits the generated log information 405 to the server 300. The log information 405 is registered in the server 300. Thereafter, in step S253, a bitmap image generated by analyzing the job information 500 is printed by the printer engine 260. The process then returns. This makes it possible to print the received job information 500 even in the case where the log acquisition information 810 indicates that the log has not been acquired.

In this case, as in the case shown in FIG. 12, a message may be sent to a user or an administrator via a communication medium such as e-mail to notify that the log information 400 from the host 100 has not been acquired.

In the present embodiment, as described above, log information is temporarily stored in the temporary log storage unit 350. Thereafter, it is determined whether log information associated with the job information 500 transmitted from the host 100 to the printer 200 has already been stored. If so, the printer 200 prints the PDL data in the normal mode. If the PDL data is printed by the printer 200 in the normal mode, the server 300 moves the log information from the temporary log storage unit 350 into the main log storage unit 360.

Thus, even if the job information 500 is transmitted a plurality of times from the host 100 to the printer 200, the corresponding UUID and the associated MAC value are not found in the temporary log storage unit 350 in the second and following printing operations, and thus the server 300 can control the printing operation such that printing is not performed for such PDL data.

Second Exemplary Embodiment

Figure 14:
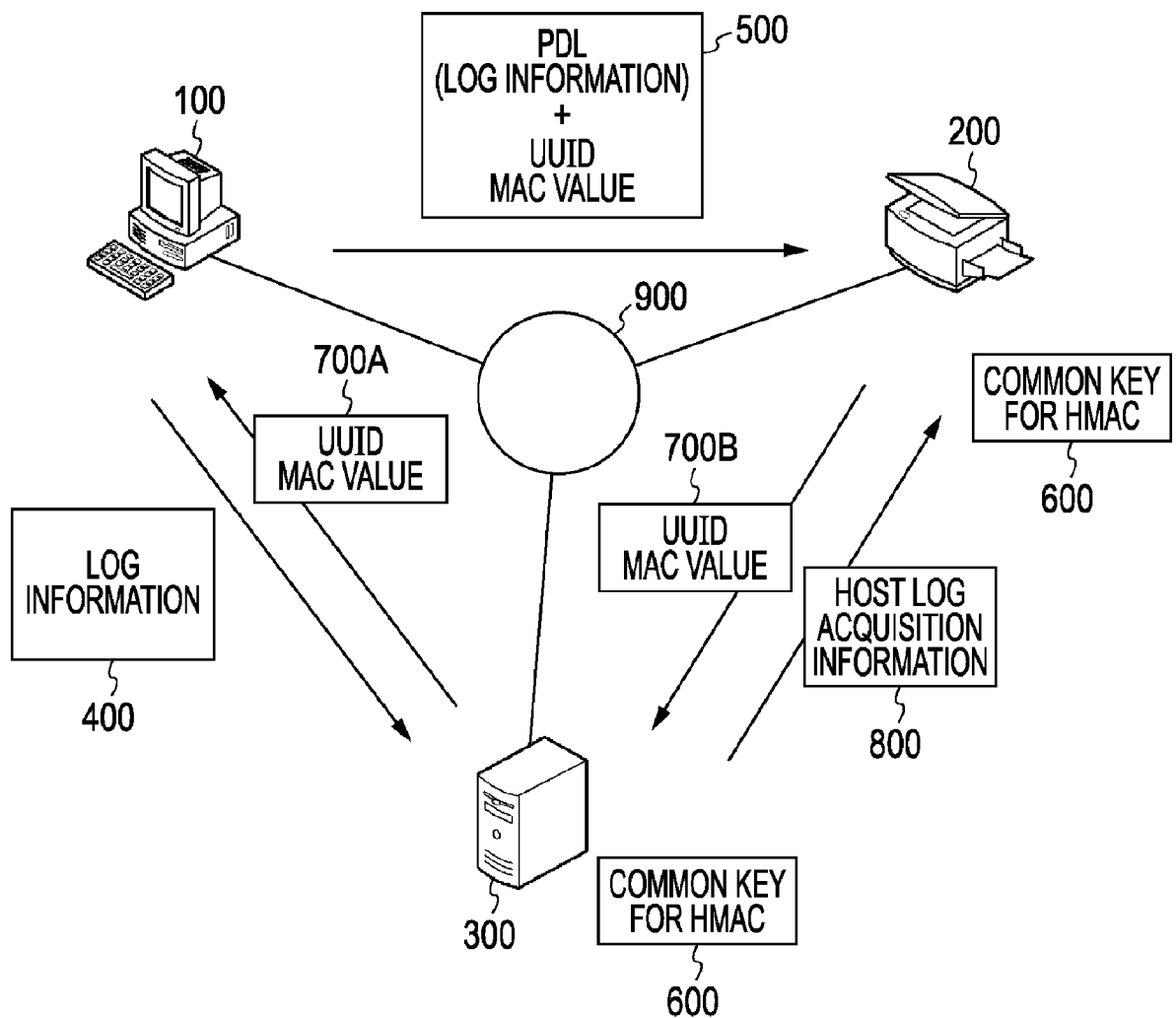
FIG. 14 is a diagram illustrating a print system including a log management apparatus according to an embodiment of the present invention.

FIG. 14 is a diagram illustrating a print system including a log management apparatus according to a second exemplary embodiment of the present invention. In the present embodiment, the print system is configured such that a host, a printer, and a server are capable of communicating with each other via a network.

The number of printers is not limited to that shown in FIG. 14, but the print system may include a greater number of printers.

In the print system shown in FIG. 14, information is transmitted among devices in a manner described below.

The present embodiment is different from the first embodiment in that a HMAC common key is shared by the printer 200 and the server 300.

In FIG. 14, when the printer 200 receives a block from the host 100 via the printer communication device 210, the printer log processor 240 verifies the MAC value. Note that the block received from the host 100 is one of the followings: the PDL header block 510, the page draw block 520, or the PDL terminator block 530.

The server 300 generally manages a plurality of printers 200. In such a print system in which the server 300 manages a plurality of printers 200, the second embodiment allows a reduction in the processing load imposed on the server 300.

The verification of the UUID and the MAC value is performed by the printer 200. Therefore, instead of transmitting both the UUID and the MAC value included in the information 700 from the printer 200 to the server 300, only the UUID may be transmitted.

Figure 15:
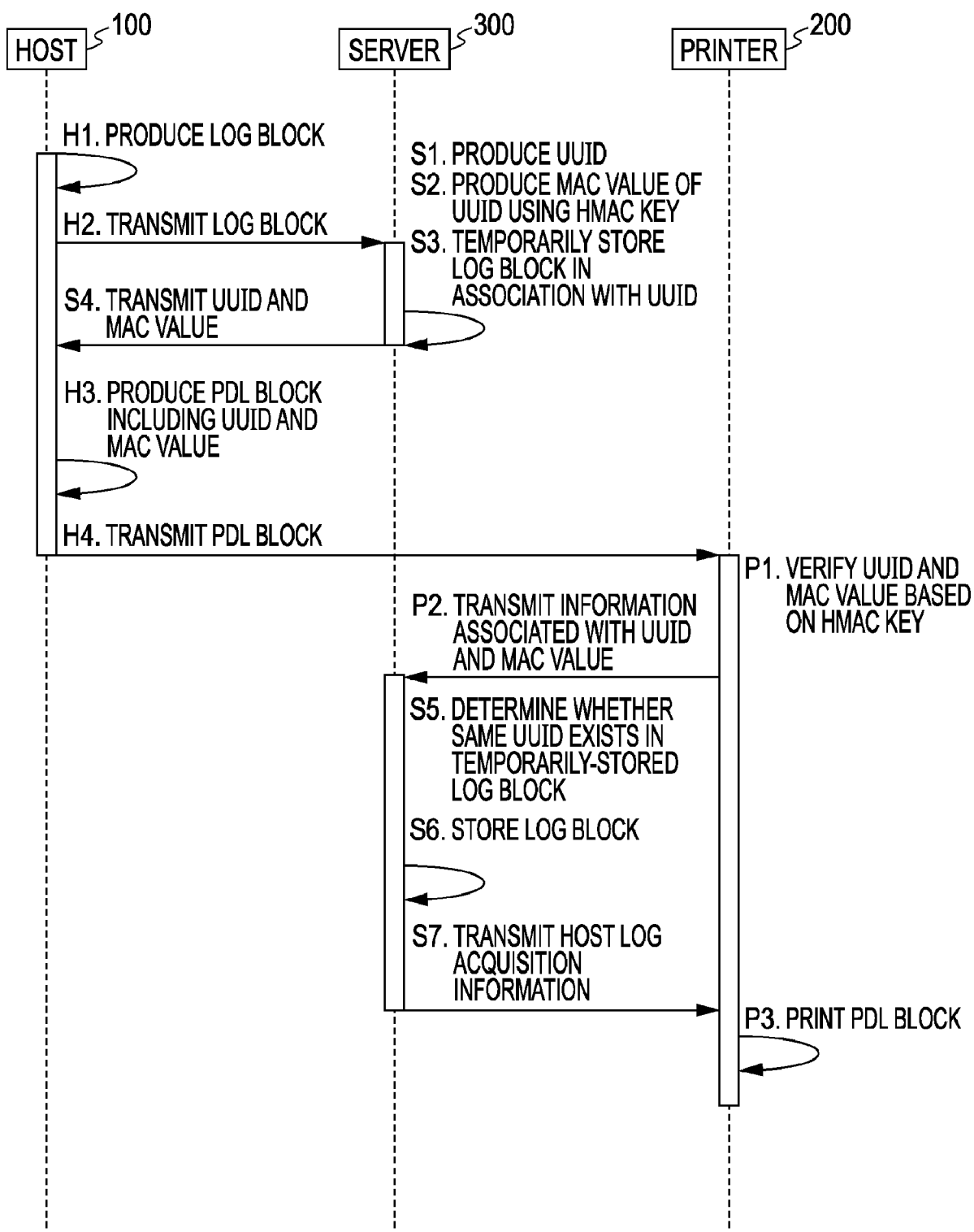
FIG. 15 is a diagram illustrating an example of a sequence performed by a host, a printer, and a server.

FIG. 15 is a diagram illustrating an example of a second sequence performed by the host 100, the printer 200, and the server 300 shown in FIG. 2. More specifically, FIG. 15 illustrates a data flow in a normal operation. In FIG. 15, H1 to H4 denote steps performed by the host 100. S1 to S7 denote steps performed by the server 300. P1 to P3 denote steps performed by the printer 200.

The sequence shown in FIG. 15 is different from the sequence shown in FIG. 8 according to the first embodiment is in that the verification of the UUID and the MAC value is performed in step P1 by the printer 200 using the HMAC common key but the verification is not performed by the server 300.

Steps H1 to H4 are similar to those shown in FIG. 8, and thus a further explanation thereof is omitted.

In step P1, the printer 200 receives the job information 500 including the PDL header block 510, the page draw block 520, or the PDL terminator block 530 from the host 100 via the printer communication device 210.

The received PDL header block 510, the page draw block 520, or the PDL terminator block 530 is transferred to the printer controller 220 and interpreted thereby.

The printer controller 220 transfers the UUID 711, 712 or 713 and the corresponding MAC value 721, 722 or 723 to the printer log processor 240.

Using the printer log processor 240, the printer 200 checks whether the UUID 711, 712 or 713 and the corresponding MAC value 721, 722 or 723 are valid. This check is performed using the HMAC common key shared by the server 300.

In step P2, the printer log processor 240 transmits the information 700B including the UUID and the MAC value in the data structure shown in FIG. 4 to the server 300 via the printer communication device 210.

Next, in step S5, the server 300 determines whether a record corresponding to the UUID 711, 712, or 713 received from the printer 200 is stored in the data structure shown in FIG. 5 in the temporary log storage unit 350. In a case where the determination by the server 300 is that a record of interest is stored, it is determined that the log has been issued by the host 100.

In the case where it is determined in step S5 that the record of interest is stored in the temporary log storage unit 350, then, in step S6, the server 300 moves the log block of the record into the main log storage unit 360. If a user maliciously issues job information 500 a plurality of times by copying it, no record associated with the UUID 713 is found in the temporary log storage unit 350 for second following PDL processes, and thus it is possible to detect such invalid job information 500.

From the results in steps S6 and S7, the server 300 determines whether the log generated by the host 100 in association with the job information 500 received by the printer 200 is stored in the server 300.

In step S7, the server 300 describes the determination result in the host log acquisition information 800 and transmits the host log acquisition information 800 to the printer 200 via the server communication device 310.

On the other hand, in step P3, the printer 200 receives the log acquisition information 810 of the host log acquisition information 800 from the server 300 via the printer communication device 210. If the received log acquisition information 810 of the host log acquisition information 800 indicates that the log has been acquired, then the printer controller 220 of the printer 200 performs printing using the RIP 250.

In the first and second embodiments described above, the UUID is used. Alternatively, other ID may be generated and used in the management as long as the ID uniquely identifies the log information 400.

In the first and second embodiments described above, the MAC value is generated using the HMAC function. Alternatively, the MAC value may be generated using other functions.

That is, other methods may be used as long as the methods can indicate that the UUID is valid one issued by the server 300.

When the MAC value is generated, a mixture of the UUID and other information such as a predetermined constant or part of the log information may be used.

In the first and second embodiments described above, when information including the UUID and the MAC value is received from the printer 200, the log stored in the temporary log storage unit 350 disposed in the server 300 is moved into the main log storage unit 360, and the check is performed as to whether printing has been performed.

Alternatively, the data structure associated with UUID and the log shown in FIG. 5 may further include information indicating whether the printing has been performed or not.

Third Exemplary Embodiment

Figure 16:
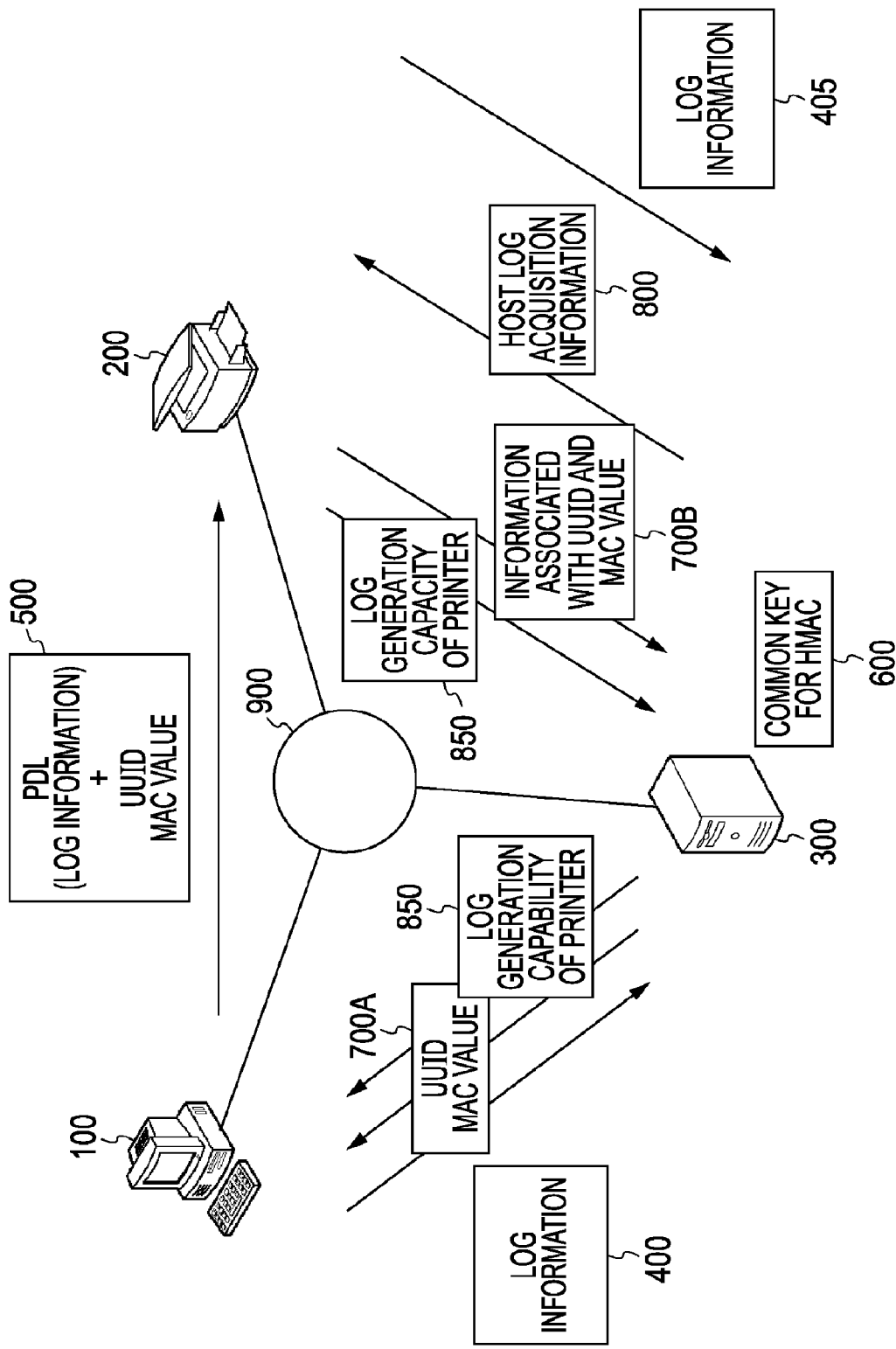
FIG. 16 is a diagram illustrating a print system including a log management apparatus according to an embodiment of the present invention.

FIG. 16 is a diagram illustrating a print system including a log management apparatus according to a third exemplary embodiment of the present invention. In this third exemplary embodiment, the print system is configured such that a host 100, a printer 200, and a server 300 are capable of communicating with each other via a network.

The number of printers is not limited to that shown in FIG. 16, but the print system may include a greater number of printers.

In the print system shown in FIG. 16, information is transmitted among devices in a manner described below.

The present embodiment is different from the first embodiment in that log generation capability 850 of the printer 200 is acquired in advance and stored in a storage device of the server 300.

In FIG. 16, when printing is performed, the host 100 queries the server 300 as to the log generation capability of the printer 200 to be used thereby to acquire the log generation capability of the printer 200. In a case where the host 100 determines that the printer 200 to be used does not have the log generation capability, the host 100 generates the log information 400 and transmits it to the server 300. Thereafter, the process is performed in a similar manner to the first embodiment described above.

On the other hand, in a case where the host 100 determines that the printer 200 to be used has the log generation capability, the host 100 generates the job information 500 and transmits it to the printer 200. Thereafter, the process is performed in a similar manner to the first embodiment described above.

In the present embodiment, information indicating the log generation capability of the printer 200 is stored in advance in the storage device of the server 300. Alternatively, the information indicating the log generation capability of the printer 200 may be stored in the host 100. Instead, a query of the log generation capability may be issued to the printer 200 when printing is performed.

Figure 17:
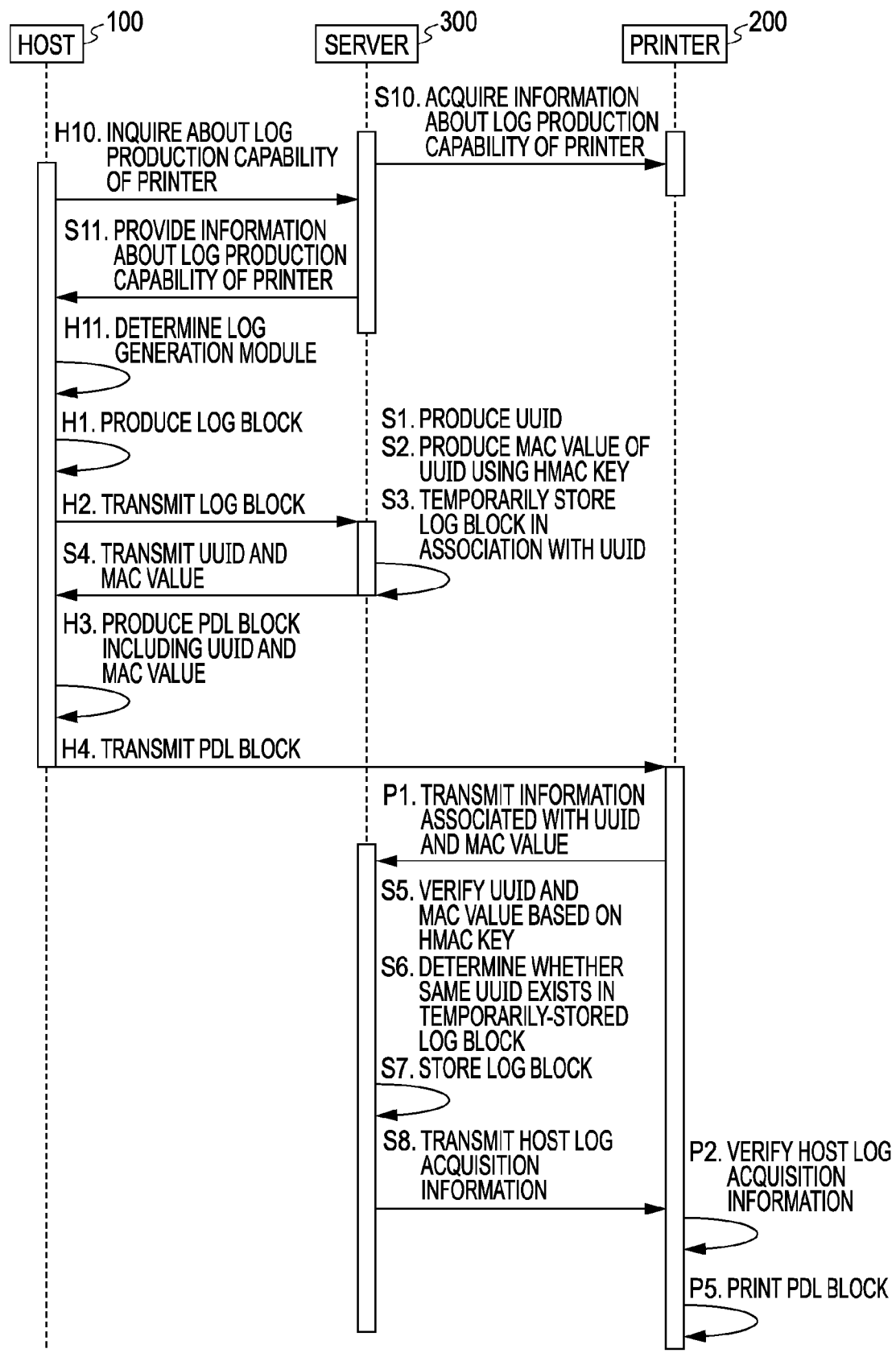
FIG. 17 is a diagram illustrating an example of a sequence performed by a host, a printer, and a server.

FIG. 17 illustrates an example of a third sequence performed by the host 100, the printer 200, and the server 300 shown in FIG. 2. More specifically, this sequence is performed in a case where the printer 200 does not have the log generation capability and the log information is generated by the host 100. Note that FIG. 17 illustrates a data flow in a normal operation. In FIG. 17, H1 to H4, H10 and H11 denote steps performed by the host 100. S1 to S8, S10 and S11 denote steps performed by the server 300. P2 and P5 denote steps performed by the printer 200.

The sequence shown in FIG. 17 is different from the sequence shown in FIG. 8 according to the first embodiment is in that in steps S10, S11, H10, and H11, information indicating the log generation capability of the printer 200 is transmitted and a determination thereof is performed.

Note that in the present example, it assumed that the log information is generated normally by the host 100, and thus steps P3 and P4 are not shown because these steps are not performed in the normal mode.

In step S10, the server 300 requests the printer 200 to provide log generation capability information 850. If the log generation capability information 850 is acquired from the printer 200, it is stored in the temporary log storage unit 350.

In step H10, the host 100 requests the server 300 to provide the log generation capability information 850 of the printer 200 to be used.

In step S11, the server 300 transmits the log generation capability information 850 of the printer 200 acquired in step S10 to the host 100.

Next, in step H11, if the host 100 determines that the printer 200 does not have the log generation capability, then the host 100 determines that the log information should be generated by the host 100.

On the other hand, in a case whether it is determined that the printer 200 has the log generation capability, the process is performed in a manner described below with reference to FIG. 18.

Steps H1 to H4, S1 to S8, and P2 to P5 are similar to those in FIG. 11, and thus a further explanation thereof is omitted.

Figures 18, 19:
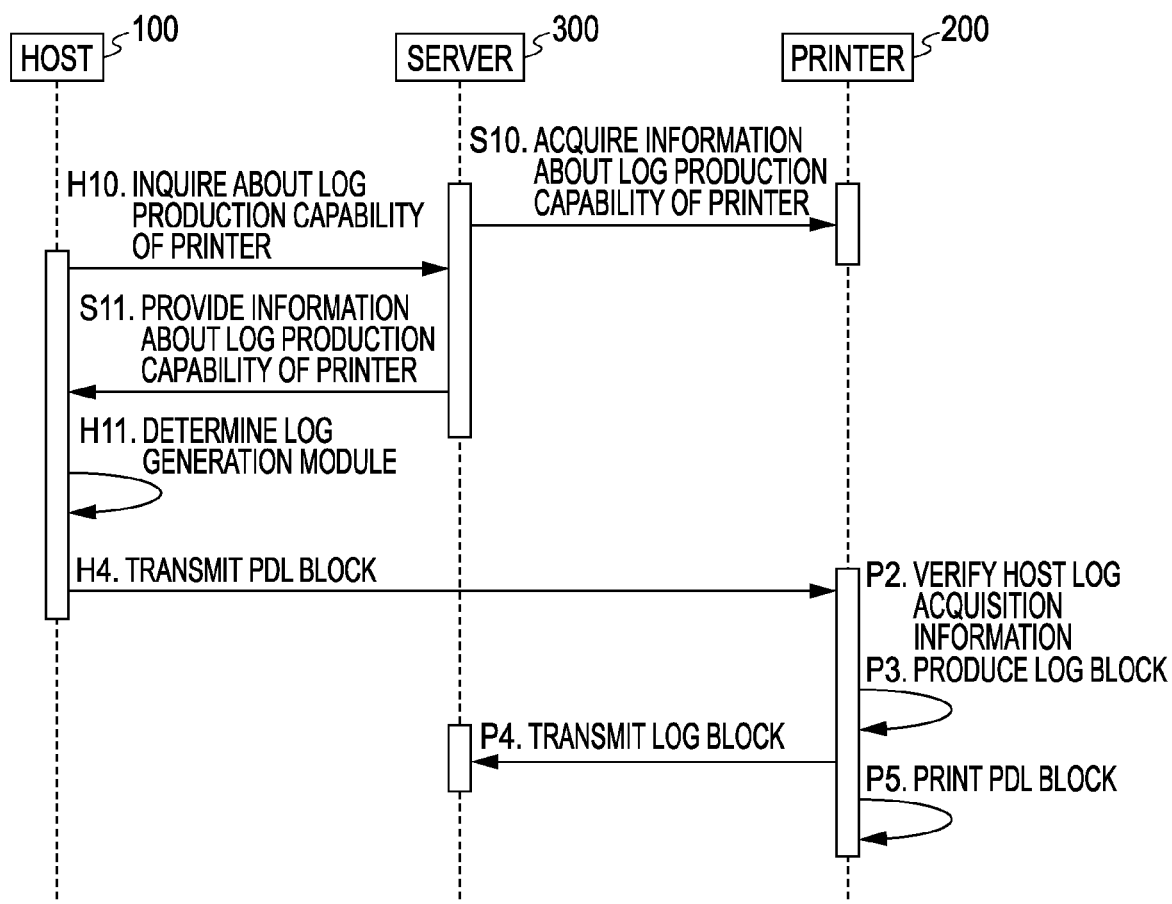
FIG. 18 is a diagram illustrating an example of a sequence performed by a host, a printer, and a server.
FIG. 19 is a diagram showing a memory map of a storage medium that stores various data processing programs readable by a management apparatus, according to an embodiment of the present invention.
Figure 22:
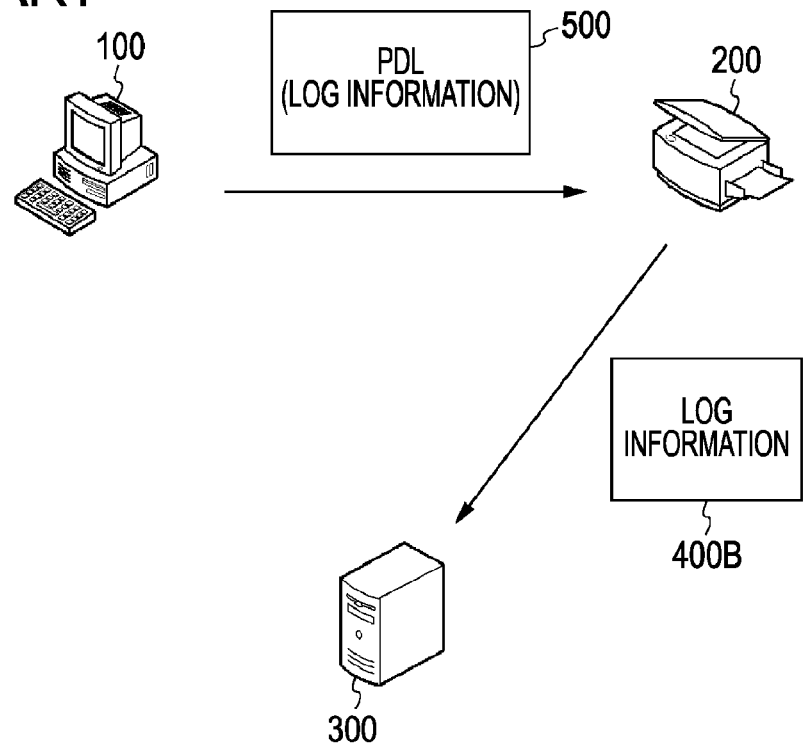
FIG. 22 is a diagram illustrating a configuration of a print system.
Figure 23:
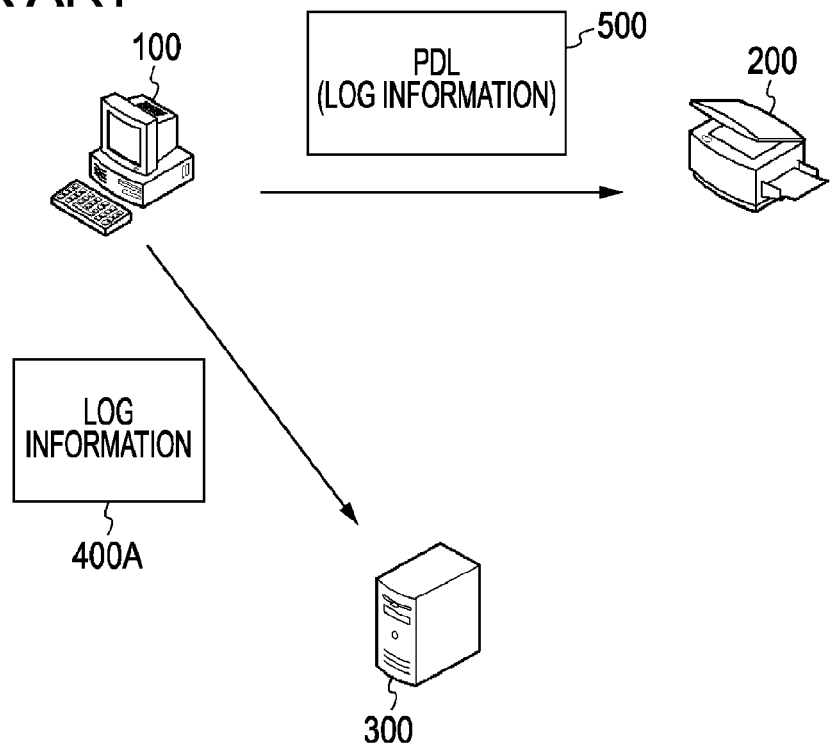
FIG. 23 is a diagram illustrating a configuration of a print system.
Figure 24:
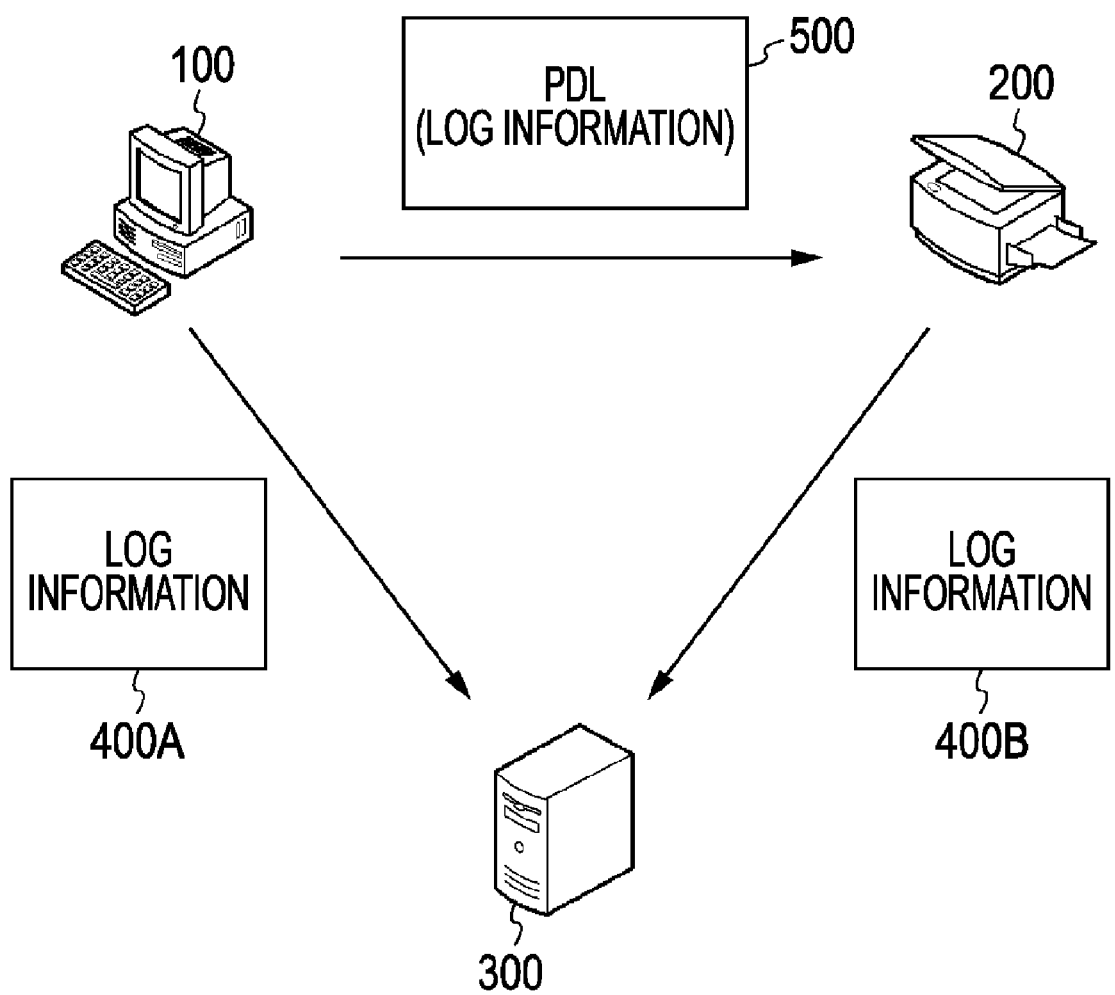
FIG. 24 is a diagram illustrating a configuration of a print system.

FIG. 18 is a diagram illustrating an example of a fourth sequence performed by the host 100, the printer 200, and the server 300 shown in FIG. 2. More specifically, this sequence is performed in a case where the printer 200 has the log generation capability and the log information is generated by the printer 200. Note that FIG. 18 illustrates a data flow in a normal operation. In FIG. 18, H4, H10, and H11 denote steps performed by the host 100. S10 denotes a step performed by the server 300. P2 to P5 denote steps performed by the printer 200.

First, in step S10, the server 300 acquires the log generation capability information 850 from the printer 200 and stores it in the temporary log storage unit 350.

Next, in step H10, the host 100 requests the server 300 to provide the log generation capability information of the printer 200 to be used.

In step S11, the server 300 transmits the log generation capability information 850 of the printer 200 to the host 100.

If the host 100 determines from the received log generation capability information 850 that the printer 200 has the log generation capability, then, in step H11, the host 100 determines that the log information should be generated by the printer 200.

In step H4, the host 100 transmits the PDL header block 510, the page draw block 520, or the PDL terminator block 530 shown in FIG. 6 to the printer 200.

On the other hand, in step P2, the printer 200 receives host log acquisition information 800 via the printer communication device 210.

In step P3, using the print log generator 280, the printer 200 generates a document information header log block 410, a page information log block 420, or a document information terminator block 430.

Next, in step P4, the printer 200 transfers the generated document information header log block 410, the page information log block 420, or the document information terminator block 430 to the server 300 via the printer communication device 210.

In step P5, the printer controller 220 of the printer 200 performs printing using the RIP 250.

In the present embodiment, as described above, it is possible to describe log information regardless of whether the print system includes a network-connected printer that does not have the capability of generating log information or regardless of whether the print system includes a network-connected host that does not have or may not have the capability of generating log information. Furthermore, the present embodiment needs a less system processing capacity, a less storage space in the server, and a less temporary storage space in the printer.

Fourth Exemplary Embodiment

Referring to memory maps shown in FIGS. 19, 20 and 21, configurations of data processing programs readable by the management apparatus, the printing apparatus and the information processing apparatus are described below.

FIG. 19 is a diagram showing a memory map of a storage medium that stores various data processing programs readable by a management apparatus, according to an embodiment of the present invention.

FIG. 20 is a diagram showing a memory map of a storage medium that stores various data processing programs readable by a printing apparatus, according to an embodiment of the present invention.

FIG. 21 is a diagram showing a memory map of a storage medium that stores various data processing programs readable by an information processing apparatus according to an embodiment of the present invention.

Note that in addition to information shown in FIG. 9, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIGS. 9, 10, 11, 12, and 13 according to the embodiment of the present invention may be implemented by installing programs from the outside and executing the installed programs. In such a case, the present invention can be applied to a system in which information including such programs is supplied to an output device from a storage medium such as a CD-ROM, flash memory, or FD or from an external storage medium via a network.

The present invention may also be practiced by supplying a medium such as a storage medium having a software program code stored therein to an apparatus, loading the software program code from the medium onto a computer (or a CPU or an MPU) of a system or an apparatus, and executing the software program on the computer.

In this case, the program code read from the storage medium implements the novel functions disclosed in the embodiments described above, and the storage medium on which the program code is stored falls within the scope of the present invention.

In this case, there is no particular restriction on the form of the program as long as it functions as a program. That is, the program may be realized in various forms such as an object code, a program executed by an interpreter, script data supplied to an operating system, etc.

Storage media which can be employed in the present invention to supply the program include a floppy disk, a hard disk, an optical disk, a magneto-optical disk, an MO disk, a CD-ROM disk, a CD-R disk, a CD-RW disk, a magnetic tape, a non-volatile memory card, a ROM, and a DVD disk.

In this case, the program code read from the storage medium implements the functions disclosed in the embodiments described above, and the storage medium on which the program code is stored falls within the scope of the present invention.

The program may also be supplied such that a client computer is connected to an Internet Web site via a browser, and an original computer program or a file including a compressed computer program and an automatic installer may be downloaded into a storage medium such as a hard disk of the client computer thereby supplying the program. The program code of the program according to an embodiment of the present invention may be divided into a plurality of files, and respective files may be downloaded from different Web sites. Thus, a WWW server, an ftp server and similar servers that provide a program or a file that allows the functions according to an embodiment of the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer using the downloaded key information thereby achieving the one or more functions according to any embodiment of the present invention.

The functions disclosed in the embodiments may be implemented not only by executing the program code on a computer, but part or all of the process may be performed by an operating system or the like running on the computer in accordance with the program code. Such implementation of the functions also falls within the scope of the present invention.

Furthermore, the scope of the present invention also includes an apparatus/system in which a program code is loaded from a storage medium into a memory provided on a function extension board inserted in a computer or provided in a function extension unit connected to the computer, and then a part of or the whole of a process is performed by a CPU or the like in the function extension board or the function extension unit in accordance with the program code thereby implementing the functions of any embodiment described above.

Note that the present invention is not limited to the details of the embodiments described above, but various modifications (including combinations of embodiments) are possible without departing from the spirit and the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-281899 filed Oct. 30, 2007, which is hereby incorporated by reference herein in its entirety.

What is claimed is:

1. A server apparatus configured to manage log information corresponding to job information transmitted from a host computer to an image processing apparatus, comprising:
    a storage unit configured to store, in a temporary storage area, the log information received from the host computer, the log information including page image data corresponding to each of pages in the job information;
    an issue unit configured to issue identification information identifying the log information received from the host computer;
    a generation unit configured to generate authentication information based on the identification information, the authentication information serving as information authenticating that the identification information issued by the issue unit is the identification information generated by the server apparatus;
    a transmission unit configured to transmit the identification information issued by the issue unit and the authentication information generated by the generation unit to the host computer;
    a reception unit configured to receive, from the image processing apparatus, identification information and authentication information extracted by the image processing apparatus from job information received by the image processing apparatus;
    a determination unit configured to determine whether log information corresponding to the identification information received by the reception unit is stored in the temporary storage area;
    a moving unit configured to move the log information such that, in a case where the determination unit determines that the log information corresponding to the identification information received by the reception unit is stored in the temporary storage area, the log information stored in the temporary storage area is retained in a storage area different from the temporary storage area; and
a notification unit configured to notify the image processing apparatus of a result of the determination made by the determination unit,
wherein, the log information is deleted from the temporary storage area in accordance with the moving by the moving unit.

2. The server apparatus according to claim 1, wherein the log information is an image log based on image data formed by the job information.

3. The server apparatus according to claim 1, wherein, if the notification to the image processing apparatus from the notification unit indicates that the result of the determination made by the determination unit is that log information corresponding to the identification information received by the reception unit from the image processing apparatus is not stored in the temporary storage area, the image processing according to the job information is not performed by the image processing apparatus.

4. The server apparatus according to claim 1, further comprising an authentication unit configured to authenticate whether the identification information is identification information issued by the server apparatus based on the authentication information, by using the identification information and the authentication information received by the reception unit, wherein
the determination unit makes the determination using the identification information authenticated by the authentication unit.

5. The server apparatus according to claim 4, further comprising an authentication information notification unit configured to, if the authentication of the identification information performed by the authentication unit fails, notify the image processing apparatus of the failure of the authentication.

6. A management system comprising:
a host computer configured to generate job information;
an image processing apparatus configured to perform image processing according to the job information received from the host computer; and
a server apparatus configured to manage log information corresponding to the job information,
wherein the host computer comprising:
a log acquisition unit configured to acquire the log information corresponding to the job information;
a log transmission unit configured to transmit the log information acquired by the acquisition means to the server apparatus; and
a job transmission unit configured to transmit identification information and authentication information received from the server apparatus to the image processing apparatus together with the job information,
wherein the server apparatus comprising:
a storage unit configured to store, in a temporary storage area, the received log information transmitted from the log transmission unit, the log information including page image data corresponding to each of pages in the job information;
an issue unit configured to issue the identification information identifying the received log information transmitted from the log transmission unit;
a generation unit configured to generate the authentication information based on the identification information, the authentication information serving as information authenticating that the identification information issued by the issue unit is the identification information generated by the server apparatus;
a response unit configured to respond to the received log information transmitted from the log transmission unit by returning the identification information issued by the issue unit and the authentication information generated by the generation unit to the host computer;
a reception unit configured to receive, from the image processing apparatus, the identification information and the authentication information received by the image processing apparatus together with the job information;
a determination unit configured to determine whether determination unit corresponding to the identification information received by the reception unit is stored in the temporary storage area;
a moving unit configured to move the log information such that, in a case where the determination unit determines that the log information corresponding to the identification information received by the reception unit is stored in the temporary storage area, the log information stored in the temporary storage area is retained in a storage area different from the temporary storage area;
a notification unit configured to notify the image processing apparatus of a result of the determination made by the determination unit,
wherein, the log information is deleted from the temporary storage area in accordance with the moving by the moving unit, and
wherein the image processing apparatus comprising:
a transmission unit configured to transmit, to the server apparatus, the identification information received together with the job information from the host computer; and
a control unit configured to control a process according to the job information, in accordance with the determination result notified by the notification unit of the server apparatus.

7. The management system according to claim 6, wherein the image processing apparatus further comprising an authentication unit configured to authenticate whether the received identification information is the identification information issued by the server apparatus based on the authentication information, by using the identification information and the authentication information received together with the job information from the host computer, and
the transmission unit transmits the identification information authenticated by the authentication unit to the server apparatus.

8. The management system according to claim 6, wherein the control unit of the image processing apparatus is configured such that, if the result of the determination notified by the notification unit of the server apparatus indicates that log information corresponding to the identification information received by the reception unit is not stored in the temporary storage area, the control unit acquires the log information corresponding to the job information, transmits the acquired log information to the server apparatus, and performs the image processing according to the job information.

9. A method for management in a server apparatus configured to manage log information corresponding to job information transmitted from a host computer to an image processing apparatus, the method comprising:
storing, in a temporary storage area, the log information received from the host computer, the log information including page image data corresponding to each of pages in the job information;

issuing identification information identifying log information received from the host computer;

generating authentication information based on the identification information, the authentication information serving as information authenticating that the issued identification information is the identification information generated by the server apparatus;

transmitting the issued identification information and the authentication information to the host computer;

receiving, from the image processing apparatus, identification information and authentication information extracted by the image processing apparatus from job information received by the image processing apparatus;

determining whether the log information corresponding to the identification information is stored in the temporary storage area;

moving the log information such that, in a case where it is determined that the log information corresponding to the identification information received in the receiving step is stored in the temporary storage area, the log information stored in the temporary storage area is retained in a storage area different from the temporary storage area; and notifying the image processing apparatus of the determination result, wherein, the log information is deleted from the temporary storage area in accordance with the moving.

10. The method according to claim 9, wherein the log information is an image log based on image data produced from the job information.

11. The method according to claim 9, wherein, if the notification to the image processing apparatus indicates that the determination result is that the log information corresponding to the identification information received from the image processing apparatus is not stored in the temporary storage area, the image processing according to the job information is not performed by the image processing apparatus.

12. The method according to claim 9, further comprising authenticating whether the identification information is the identification information issued by the server apparatus based on the authentication information, by using the identification information and the authentication information; and
    making the determination based on the authenticated identification information.

13. The method according to claim 12, further comprising, if the authentication of the identification information fails, notifying the image processing apparatus of the failure of the authentication.

14. A method for managing a management system including a host computer configured to generate job information, an image processing apparatus configured to perform image processing according to the job information received from the host computer, and a server apparatus configured to manage log information corresponding to the job information, the method comprising:
    acquiring, by the host computer, the log information corresponding to the job information;
    transmitting, by the host computer, the acquired log information to the server apparatus; and
    transmitting, by the host computer, identification information and authentication information received from the server apparatus to the image processing apparatus together with the job information;
    storing, by the server apparatus, in a temporary storage area, the received log information, the log information including page image data corresponding to each of pages in the job information;
    issuing, by the server apparatus, identification information identifying the received log information;
    generating, by the server apparatus, authentication information based on the identification information, the authentication information serving as information authenticating that the issued identification information is the identification information generated by the server apparatus;
    responding, by the server apparatus, to the received log information, by returning the identification information and the authentication information to the host computer;
    receiving, from the image processing apparatus, the identification information and the authentication information received by the image processing apparatus together with the job information the;
    determining, by the server apparatus, whether the log information corresponding to the identification information is stored in the temporary storage area;
    moving the log information such that, in a case where it is determined that the log information corresponding to the identification information received in the receiving step is stored in the temporary storage area, the log information stored in the temporary storage area is retained in a storage area different from the temporary storage area;
    notifying, by the server apparatus, the image processing apparatus of the determination result,
    wherein, the log information is deleted from the temporary storage area in accordance with the moving;
    transmitting, by the image processing apparatus, to the server apparatus, the identification information received together with the job information from the host computer; and
    controlling, by the image processing apparatus, the job information in accordance with the determination result of the server apparatus.

15. The method according to claim 14, the method further comprising:
    authenticating, by the image processing apparatus, whether the identification information is identification information issued by the server apparatus based on the authentication information, by using the identification information and the authentication information together with the job information from the host computer; and
    transmitting, by the image processing apparatus, the authenticated identification information to the server apparatus.

16. The method according to claim 14, wherein the image processing apparatus includes, if the determination result of the server apparatus indicates that log information corresponding to the identification information received by the reception unit is not stored in the temporary storage area, acquiring the log information corresponding to the job information, transmitting the acquired log information to the server apparatus, and performing the image processing according to the job information.

17. A non-transitory computer-readable storage medium having a computer-executable program stored thereon for causing a computer to execute a method for management in a server apparatus configured to manage log information corresponding to job information transmitted from a host computer to an image processing apparatus, the method comprising:

storing, in a temporary storage area, the log information received from the host computer, the log information including page image data corresponding to each of pages in the job information;

issuing identification information identifying log information received from the host computer;

generating authentication information based on the identification information, the authentication information serving as information authenticating that the issued identification information is the identification information generated by the server apparatus;

transmitting the issued identification information and the authentication information to the host computer;

receiving, from the image processing apparatus, identification information and authentication information extracted by the image processing apparatus from job information received by the image processing apparatus;

determining whether the log information corresponding to the identification information is stored in the temporary storage area;

moving the log information such that, in a case where it is determined that the log information corresponding to the identification information received in the receiving step is stored in the temporary storage area, the log information stored in the temporary storage area is retained in a storage area different from the temporary storage area; and notifying the image processing apparatus of the determination result, wherein, the log information is deleted from the temporary storage area in accordance with the moving.

* * * * *